US009355572B2

(12) United States Patent
Stanley

(10) Patent No.: US 9,355,572 B2
(45) Date of Patent: May 31, 2016

(54) SYSTEM AND METHOD FOR ELEVATED SPEED FIREARMS TRAINING

(71) Applicant: Conflict Kinetics LLC, Reston, VA (US)

(72) Inventor: Brian Stanley, Reston, VA (US)

(73) Assignee: Conflict Kinetics Corporation, Reston, VA (US)

( * ) Notice: Subject to any disclaimer, the term of this patent is extended or adjusted under 35 U.S.C. 154(b) by 0 days.

(21) Appl. No.: 13/771,073

(22) Filed: Feb. 19, 2013

(65) Prior Publication Data

US 2013/0260342 A1      Oct. 3, 2013

Related U.S. Application Data

(63) Continuation-in-part of application No. 12/202,218, filed on Aug. 29, 2008, now Pat. No. 8,398,404.

(60) Provisional application No. 60/969,143, filed on Aug. 30, 2007.

(51) Int. Cl.
*F41G 3/26* (2006.01)
*G09B 19/00* (2006.01)
(Continued)

(52) U.S. Cl.
CPC ............... *G09B 19/00* (2013.01); *F41A 33/00* (2013.01); *F41G 3/2627* (2013.01); *F41G 3/2655* (2013.01); *F41J 5/02* (2013.01); *F41J 11/00* (2013.01); *G09B 19/0038* (2013.01)

(58) Field of Classification Search
CPC ......... F41A 33/00; F41G 3/26; F41G 3/2627; F41G 3/2694; F41G 3/2655; G09B 19/00
USPC ....................... 434/11, 16, 21, 22; 463/51–52
See application file for complete search history.

(56) References Cited

U.S. PATENT DOCUMENTS 4,427,199 A    1/1984  Faith
5,016,890 A    5/1991  Sato et al.
(Continued)

OTHER PUBLICATIONS

Frank E Ritter & Lael J. Schooler (2002). The learning curve. In International encyclopedia of the social and behavioral sciences. 8602-8605. Amsterdam: Pergamon.
(Continued)

*Primary Examiner* — Sam Yao
*Assistant Examiner* — Jerry-Daryl Fletcher
(74) *Attorney, Agent, or Firm* — SmithAmundsen LLC; Dennis S. Schell; Gabriel T. Applegate

(57) ABSTRACT

The system and method to advance human performance in sighting, tracking, recognizing, and reacting to (collectively "engaging") moving and stationary stimuli, for example, advancing skill in engaging targets with a firearm. System components include software and hardware that provide target and non-target image stimuli that can be manually or automatically generated as stationary or moving stimuli in a blank, gridded, or a rendered scene environment. The methods including an initial phase providing increasing stimuli rigor, for example, movement speeds and/or reducing the interval between or the time for which stimuli are displayed, a plateau level of stimuli rigor which is above that which any trainee can properly engage the stimuli, and then a reduced stimuli rigor level, for example, the movement speeds and/or increase the interval time to levels at which the trainee properly engages the stimuli. By repeating training methods with increasing rigor, the trainee will be conditioned to achieve proper stimuli engagement with increasingly elevated speed and accuracy.

17 Claims, 25 Drawing Sheets

(51) Int. Cl.
*F41J 5/02* (2006.01)
*F41A 33/00* (2006.01)
*F41J 11/00* (2009.01)

(56) References Cited

U.S. PATENT DOCUMENTS

| | | | |
|---|---|---|---|
| 5,281,142 A | 1/1994 | Zaenglein, Jr. | |
| 5,370,399 A | 12/1994 | Liverance | |
| 5,417,573 A | 5/1995 | Cassiere, II et al. | |
| 5,810,605 A * | 9/1998 | Siefert | 434/362 |
| 6,135,456 A | 10/2000 | Cooper | |
| 6,422,945 B1 | 7/2002 | Okita et al. | |
| 6,447,408 B1 | 9/2002 | Bonaventura | |
| 6,960,085 B2 | 11/2005 | Hull et al. | |
| 7,396,128 B2 | 7/2008 | Feher et al. | |
| 7,664,717 B2 | 2/2010 | Jenkins et al. | |
| 7,841,950 B2 | 11/2010 | Davidson et al. | |
| 2002/0197584 A1 | 12/2002 | Kendir et al. | |
| 2003/0031986 A1* | 2/2003 | Siddle | 434/11 |
| 2004/0146840 A1 | 7/2004 | Hoover et al. | |
| 2006/0105299 A1 | 5/2006 | Ferris et al. | |
| 2006/0105842 A1 | 5/2006 | Kim et al. | |
| 2007/0121066 A1 | 5/2007 | Nashner | |
| 2008/0030466 A1* | 2/2008 | Keates et al. | 345/158 |
| 2013/0203019 A1* | 8/2013 | Nolen | 434/16 |

OTHER PUBLICATIONS

Laurent Madelain and Richard J. Krauzlis (2003). Effects of Learning on Smooth Pursuit During Transient Disappearance of a Visual Target, Journal of Neurophysiology, 90; 972-982.

* cited by examiner

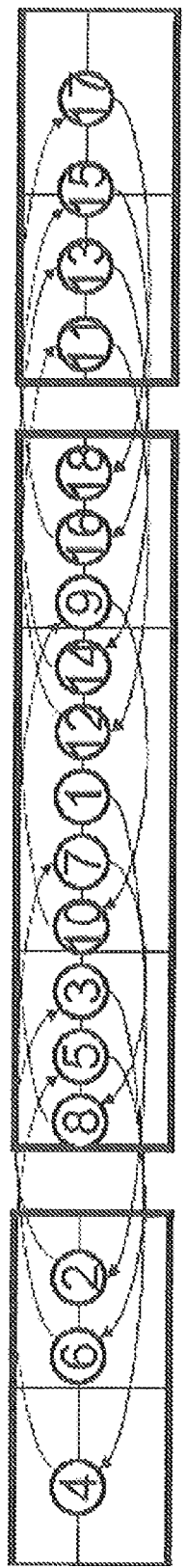
Fig. 12
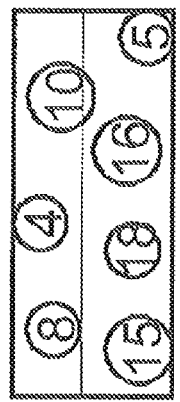
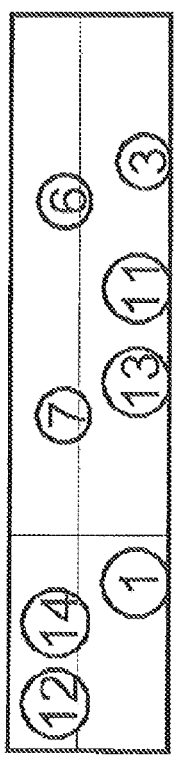
Fig. 13
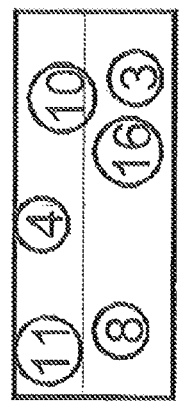
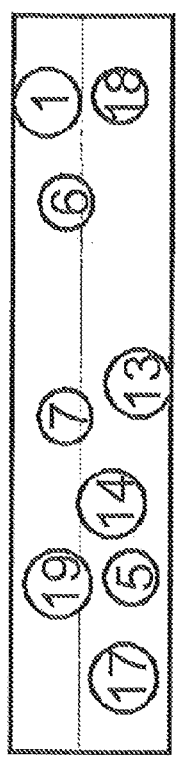
Fig. 14

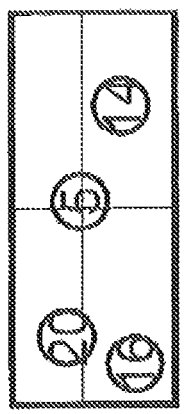
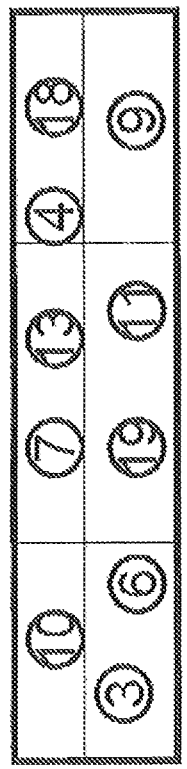
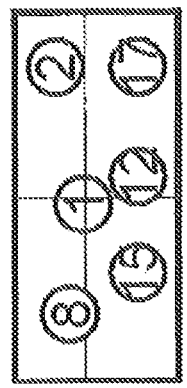
FIG. 15

FIG. 29

| Drill Name: 3-5-7 | Strong-side query | | |
|---|---|---|---|
| Hit % | Average Distance from center | Average Direction from center | Average Trough | Average time between target |
| 100 | 2.045 cm | 3 O' Clock | 4.57 | 1.089 sec |

| Drill Name: 3-5-7 | Weak-side query | | |
|---|---|---|---|
| Hit % | Average Distance from center | Average Direction from center | Average Trough | Average time between target |
| 50 | 9.055 cm | 1 O' Clock | 33.02 cm | 1.516 sec |

FIG. 30

| Drill Name: 3-5-7 | | Date 4-02-2012 | | | | |
|---|---|---|---|---|---|---|
| Target Number | side | location | Engagement | Distance from center | Direction from center | Trough | Time between shoots |
| 1 | weak | 60° B/W | Hit | 2.87 cm | 2 O' clock | 20.32 cm | 1.286 sec |
| 6 | strong | 72° C/S | Hit | 2.11 cm | 5 O' clock | 4.12 cm | 1.112 sec |
| 7 | weak | 96° C/W | Miss | 15.24 cm | 11 O' clock | 45.72 cm | 1.753 sec |
| 11 | strong | 96° T/S | Hit | 1.98 cm | 2 O' clock | 5.02 cm | 1.286 sec |

COMPREHENSIVE METRICS REPORT

ID: 34

DATE: 20121130 12:30

| 001_SHOOTER_MECHANICS_BASELINE | HITS | MISSES | TIME | PENALTIES | ACCURACY (in) | RATING |
|---|---|---|---|---|---|---|
| Low Ready 1 Disc 1 Hit | 1 | 0 | 0.89 | 0 | 2.14 | CAT IV |
| Low Ready 2 Discs 1 Hit Each | 2 | 1 | 3.12 | 0 | 3.34 | – |
| High Ready 1 Disc 1 Hit | 1 | 0 | 1.27 | 0 | 1.01 | CAT III |
| High Ready 2 Discs 1 Hit Each | 2 | 0 | 1.94 | 0 | 1.58 | CAT III |
| 180 Right Turn | 1 | 0 | 1.75 | 0 | 0.79 | – |
| 180 Left Turn | 1 | 0 | 1.72 | 0 | 2.81 | – |
| Standing 100 Yard | 1 | 0 | 1.47 | 0 | 1.01 | CK Elevated |
| Standing to Kneeling 100 Yard | 1 | 2 | 4.33 | 0 | 1.54 | – |
| Standing to Prone 100 Yard | 1 | 0 | 3.13 | 0 | 1.12 | – |
| Standing to Kneeling to Prone | 3 | 3 | 9.17 | 0 | 1.35 | – |
| 100 Yard Rectangle Prone | 1 | 0 | 0.86 | 0 | 1.35 | CK Elevated |

| BRM_BASELINE | HITS | MISSES | TIME | PENALTIES | ACCURACY (in) | RATING |
|---|---|---|---|---|---|---|
| ALTC Unsupported | 8 | 2 | 36.67 | 0 | 0.93 | Sharp Shooter |
| ALTC Kneeling | 10 | 0 | 29.88 | 0 | 0.22 | CK Elevated |

FIG. 31

SAMPLE LOGIN

Name _____

Age _____ Weight _____ Height _____

Standing heart rate _____

What hand do you shoot with?  [ Left ]  [ Right ]

Where do you place your lead hand?

| Magazine | Middle of hand guard | End of hand guard | Forearm grip |

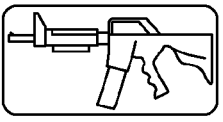

When shooting at 5 meters do you aim

[ One eye closed ]  [ Squint the weak eye ]  [ Both eyes open ]

Do you have the butt stock

[ All the way in ]  [ Half way out ]  [ All the way out ]

What is your shooting stance?

Isosceles   Weaver

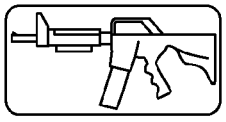

What sights are you using?  [ Eotec ]  [ Aimpoint ]  [ ACOG ]

[ Jpoint ]

FIG. 34

SYSTEM AND METHOD FOR ELEVATED SPEED FIREARMS TRAINING

CROSS-REFERENCE TO RELATED APPLICATIONS

This is a continuation-in-part of U.S. Nonprovisional patent application Ser. No. 12/202,218, filed Aug. 29, 2008, and titled SYSTEM AND METHOD FOR ELEVATED SPEED FIREARMS TRAINING, which is a nonprovisional patent application of U.S. Provisional Patent Application No. 60/969,143, filed Aug. 30, 2007, and titled AUGMENTED VISUAL ABILITIES, which are each incorporated herein by reference.

BACKGROUND

The present invention relates to human performance training, and particularly, to systems and methods for skills training involving rapid visual and cognitive reactions, for example, rapid sighting, smooth pursuit tracking, object recognition, and reaction skills required for firearms employment.

Firearms are employed for various uses, including for hunting, marksmanship sports, self-defense, police enforcement, and military operations. Traditional firearms training is inherently limited in its ability to deliver quick, high-level advancements in employment skills. Use of live ammunition during training naturally restricts the location, conditions, amount, and types of training that can be safely and economically conducted. Prior art systems and methods for traditional firearms training include live fire training conducted on a traditional shooting range, typically isolated by earthwork berms and using fixed or moving physical targets.

Inherent limitations in traditional firearms training include danger of live fire training; cost of ammunition; lead pollution and cost of lead abatement; firearms preparation and clean up time; time availability of ranges, especially in rifle training; limited multiple target rotation drills; and primitive and cumbersome data collection, analysis, and history of skill such as reaction time and accuracy; and minimal horizontally offset, e.g., 5 degrees, and no elevated targeting (due to bullet trajectory). Such constraints limit the level of rigor, e.g., level of difficulty, with which targets can be provided for engagement, and can also lead to poor firearms engagement habits, for example, keeping eyes focused on a single target and firearms sights, rather than remaining free from a single target and firearm so that other targets and stimuli within a wider field of vision can be perceived.

More recent firearms training systems and methods include target and combat environments using simulation/gaming platforms, for example, including visual displays for targets and firearms having a laser transmitter in place of projectiles; however, such systems typically lack a methodology and systematic approach needed to achieve heightened performance levels associated with sighting, tracking, recognizing, and reacting to targets over those performance levels achieved with traditional training methods and systems, including for rigorous target presentations that can be difficult to engage.

SUMMARY

The present invention may comprise one or more of the features recited in the attached claims, and/or one or more of the following features and combinations thereof.

The system and method to advance human performance in sighting, tracking, recognizing, and reacting to (collectively "engaging") moving and stationary objects, for example, advancing skill in engaging targets with a firearm. System components include software and hardware that provide target and non-target image stimuli that can be manually or automatically generated as stationary or moving stimuli in a blank, gridded, or rendered scene environment. The methods train to engage targets of increasing rigor and to teach mental acceptance of engagement of targets of elevated rigor. The methods include beginning at an initial level of stimuli rigor at which a trainee can properly engage the stimuli, then increasing stimuli movement speeds, reducing the interval between or the time for which stimuli are displayed, and/or increasing the stimuli rigor associated with other stimuli parameters to a plateau level of stimuli rigor which is above that which any trainee can properly engage the stimuli, then reducing the movement speeds, increasing the interval time, or reducing the stimuli rigor associated with other stimuli parameters to a level between the initial level and plateau level of stimuli rigor at which the trainee can properly engage the stimuli. Examples of other stimuli parameters that enhance stimuli rigor include stimuli size, opacity, contrast, color, fading/vanishing, symbology, complexity, and display location.

Such stimuli parameter can be static for an individual stimuli presentation, varying as subsequent stimuli are presented, or can additionally or alternatively change during the presentation of an individual stimuli. For example, the primary increase in stimuli rigor can be a reduction in the time period of display for stimuli, and additionally, a secondary increase in stimuli can be that the speed of movement or speed with which a stimuli fades can vary during an individual stimuli presentation, starting slow and progressively increasing, then restarting slow again upon the next individual stimuli presentation. By repeating such training methods with increasing stimuli rigor, the trainee will be conditioned to achieve proper stimuli engagement with increasingly elevated speed and accuracy at an increasing level of stimuli rigor.

System components measure performance parameters such as visual tracking accuracy, sight time, threat recognition and shot accuracy. Hardware includes one or more image projectors, screens, computers, software, laser equipped firearms, laser tracking cameras, eye trackers, and treadmills. Software includes environmental images, stimuli including targets and non-targets, image and target display control, eye movement capture, laser fire capture, and other data capture, analysis, and reporting.

The illustrative embodiment of the present systems and methods is an Elevated Ocular Tactical Conditioning ("EOTC") system, capable of training one or multiple individuals ("trainee") simultaneously. All firearms simulated in the system may be those used for actual employment with the bolt and magazine temporarily replaced with simulation components for use with the EOTC system.

Human perception tends to limit a person to see, track, recognize, and react to targets at certain understandable or comfortable speeds. EOTC trainees are conditioned to react upwards of 2 to 3 times faster with heightened awareness and accuracy than achieved with traditional firearms training, including with targets of increasing rigor. The EOTC methods and systems break a trainee's perception of what it believed to be rigorous, fast, accurate and possible. More particularly, the impossible target rigor displayed during the plateau period, followed by an the elevated but not impossible rigor of the filing period helps the trainee reach "mental acceptance" of heightened speed and accuracy against targets of elevated rigor, thus, the EOTC methods and systems provide the combined mental and physical conditioning needed to consistently achieve heightened performance.

The illustrative EOTC method and system may include hardware and software associated with three types of training:
- Kinetic Saccadic Eye Tracker ("K-SET"), used primarily to elevate sighting and tracking performance;
- Rapid subject matter recognition ("RSMR"), used primarily to elevate fine motor skills, target and non-target stimuli recognition performance; and
- Tactical Ocular Reaction Area ("TORA"), used to elevate all aspects of sighting, fine and gross motor skills and engagement.

Every shot fired is measured, timed, and stored in a trainee's data file. Trainees can review their strengths, deficiencies and performances for various scenarios and for changes in tactics, firearms type, holster type, goggle type, glove type, and the like.

Ocular muscles or saccadic eye muscles can be conditioned to perform like any other muscle in the body. Persons that are trained to see first can then be trained to react first. Training research demonstrates that a person's economy of motion has an enormous effect on their reaction abilities, as well as their radial efficiency to multiple targets. Economy of motion can reduce target acquisition times upwards of one second, which could be the difference between life and death. The present methods and systems provide measurement of baseline performance and training to enhance engagement of stimuli.

A natural deficiency between the eyes and brain is called "visual suppression". Visual suppression exists to stop the visual system from being confused by blurred images that the eye receives while it is moving rapidly from one object or stimulus to another. This suppression presents as a "blackout" of all images between the two stimuli. Most people are unaware of this blackout even though a 90 degree move can be as much as ⅓ of a second with no image. Awareness and training relating to visual suppression heightens firearms performance.

Specifically, it has been discovered that training to sight, track, recognize, and react to stimuli at elevating speeds and/or target rigor enables the eyes to develop strength and agility like any other part of the body, naturally heightening visual speeds and abilities while reducing the visual suppression area. Upwards of 200% increase in performance after six 30 minute training sessions have been achieved. Methods include having the eyes start tracking at a slow reasonable speed and/or target rigor, gradually elevating to impossible speeds and/or target rigor, and finally slowing down to a slightly more comfortable speed and/or target rigor. Including the three illustrative K-SET, RSMR, and TORA scenarios, the EOTC includes visually acquiring 1010 targets and firing 530 virtual rounds around a 220° area, capturing and analyzing data, while taking only 30 minutes to complete.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which:

FIG. 12 shows an illustrative target pattern associated with a reverse reflex training scenario of the disclosed methods and systems;

FIG. 13 shows an illustrative target pattern associated with a first random distribution training scenario of the disclosed methods and systems;

FIG. 14 shows an illustrative target pattern associated with a second random distribution training scenario of the disclosed methods and systems;

FIG. 15 shows another illustrative target pattern presented on an illustrative grid pattern associated with training scenarios of the disclosed methods and systems;

FIGS. 28-32 show illustrative training and assessment reports that can be provided by the systems disclosed herein;

FIG. 34 shows an illustrative input screen layout associated with trainee profile attributes and for uses with the process of FIG. 33.

DESCRIPTION OF THE ILLUSTRATIVE EMBODIMENTS

Figure 1:
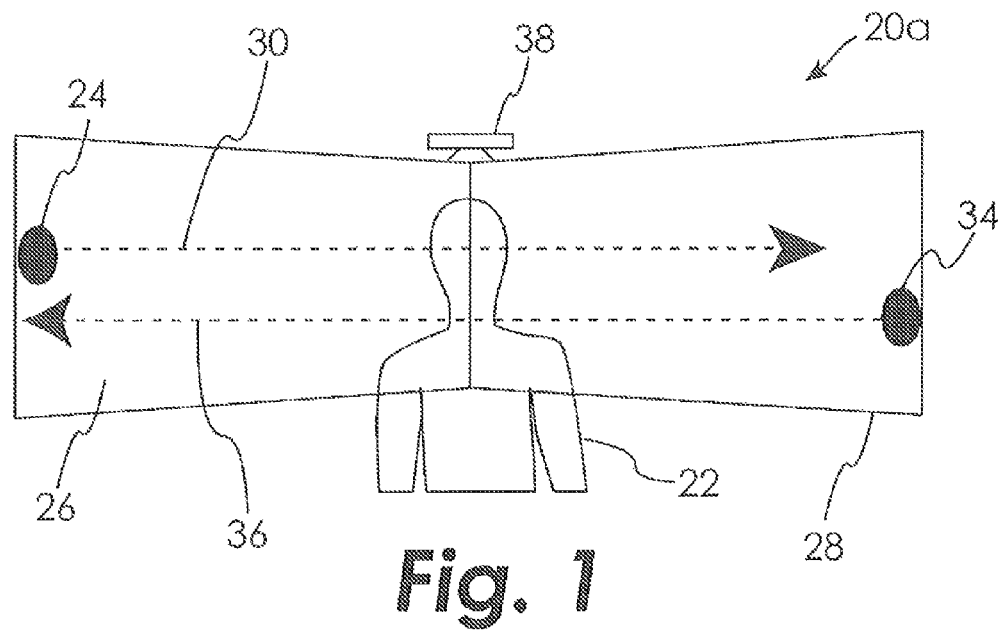
FIG. 1 shows a display portion and illustrative stimuli of an illustrative embodiment of a method and system for EOTC according to the present disclosure, for example for K-SET training.

For the purposes of promoting and understanding the principals of the invention, reference will now be made to one or more illustrative embodiments illustrated in the drawings and specific language will be used to describe the same.

The disclosed methods and systems for displaying a series of static and/or moving visual stimuli to a trainee are used to conditioning an enhanced trainee engagement of the stimuli. The engagement skills being conditioned for a particular embodiment of the disclosed methods and systems may be one or more than one of sighting, tracking, recognizing, and reacting to visual stimuli. For example, the engagement conditioned in first embodiment can be limited to simply the training sighting and tracking a sequence of moving targets on a visual display(s) and measuring the trainee's performance. For example, the engagement skills conditioned in a second embodiment can be sighting, tracking, and recognizing threat and non-threat targets on a visual display(s) and measuring the trainee's. And for example, the engagement skills conditioned in a third embodiment can be sighting, tracking, recognizing, and reacting to, for example firing on threat and not firing on non-threat targets and measuring the trainee's performance.

For example, as shown in FIG. 1, for a first illustrative system and method 20*a* for EOTC, a trainee 22 is conditioned by displaying a first target (stimulus) 24 adjacent the left side of one or more displays 26 and 28 and the first target 24 subsequently moving rapidly in a straight line pattern 30 to the right side of the displays 26 and 28. After a delay interval, for example 0.50 seconds, a second target (stimulus) 34 can be displayed adjacent the right side of displays 26 and 28, pause for a present or random amount of time, then move rapidly in a straight line pattern 36 to the left, at a speed greater than that of pattern 30 for target 24. Subsequent targets (not shown) can follow an identical or alternative pattern of movement and delay and incrementally increasing rigor, for example, increasing speeds, making it difficult for the trainee 22 to accurately sight and track the subsequent targets. An ocular tracker 38 can be used to determine the trainee's performance in sighting and tracking targets.

Figure 2A:
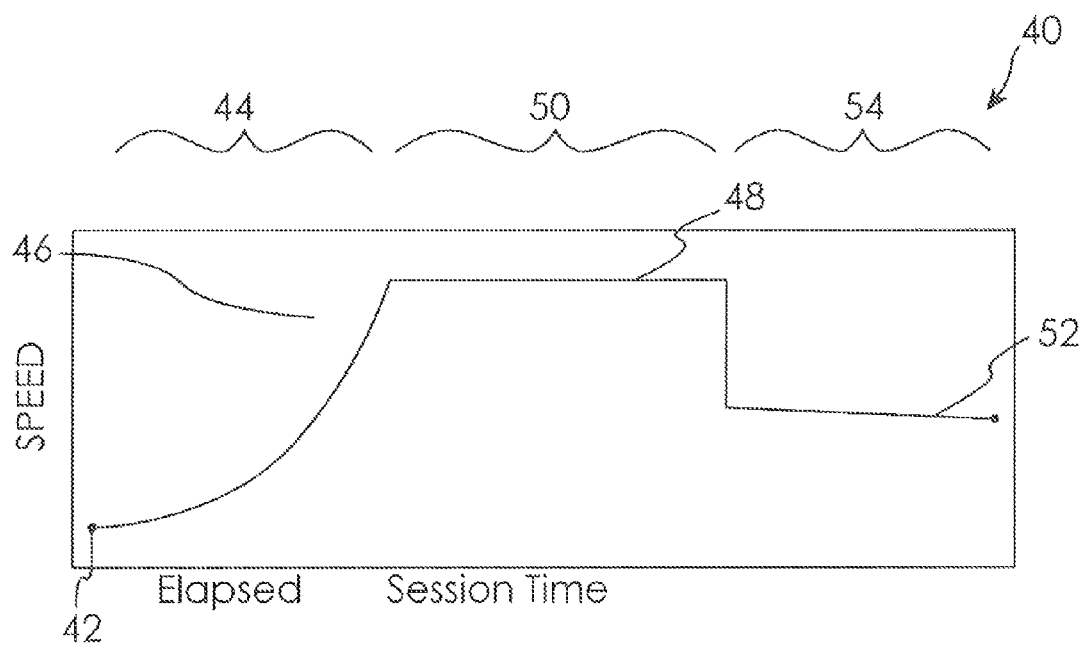
FIGS. 2A and 2B are graphs illustrating phases of training associated with the illustrative embodiments of the method and system for EOTC.

Referring to FIG. 2A, the graph of target rigor vs. elapsed time associated with the illustrative system and method 20*a*, shows various phases of a training session 40. After an initial rigor 42 associated with the first target 24, a ramp period 44 of incrementally increasing rigor is used for the second target 34 and subsequent targets (not shown), making it more and more difficult for the trainee 22 to sight and track the targets. After a threshold rigor is reached or percentage 46 at which the trainee 22 can no longer consistently and accurately track targets, a set rigor 48 is used for subsequent targets during a plateau period 50. For example, a threshold percentage used to end the ramp period and initiate the plateau period 50 may be, for example, 50%, 25%, or 10%. Alternatively, the ramp period may continue, regardless of trainee success in sighting and tracking targets, until approaching or reaching a preselected set rigor 48 level used during plateau period 50. For example, the preselected rigor level can be above that which any trainee can properly sight and track the targets. For example, a target rigor level that is above that typically achieved by a professional firearms shooter, known as a "plus life" speed/rigor, for example, 25% above that typically achieved by a professional firearms shooter. Or, for example, a target rigor level that is above the desired goal for the trainee 22, for example, 25% above the desired rigor level for the trainee 22.

After the plateau period 48, for example a specific period of time, for example 45 seconds, or a specific number of targets, a comfortable rigor 52 is used for subsequent targets during a final period 54, for example, a level higher than the level for the initial rigor 42 and below the level for the set rigor 48 used during the plateau period 50.

The rigor level can be provided by adjustment of one or more of the following parameters for targets (stimuli): speed of movement, interval time for targets (between initiating of target displays or rest time between target displays), time period of display of target, size, opacity, contrast, brightness, color, fading/vanishing, symbology, complexity, and display location. As discussed above, such changes in level of target rigor can be applied in a primary fashion, increasing with subsequent stimuli presented, and additionally or alternatively, in a secondary fashion, increasing within an individual stimuli presentation.

Figure 2B:
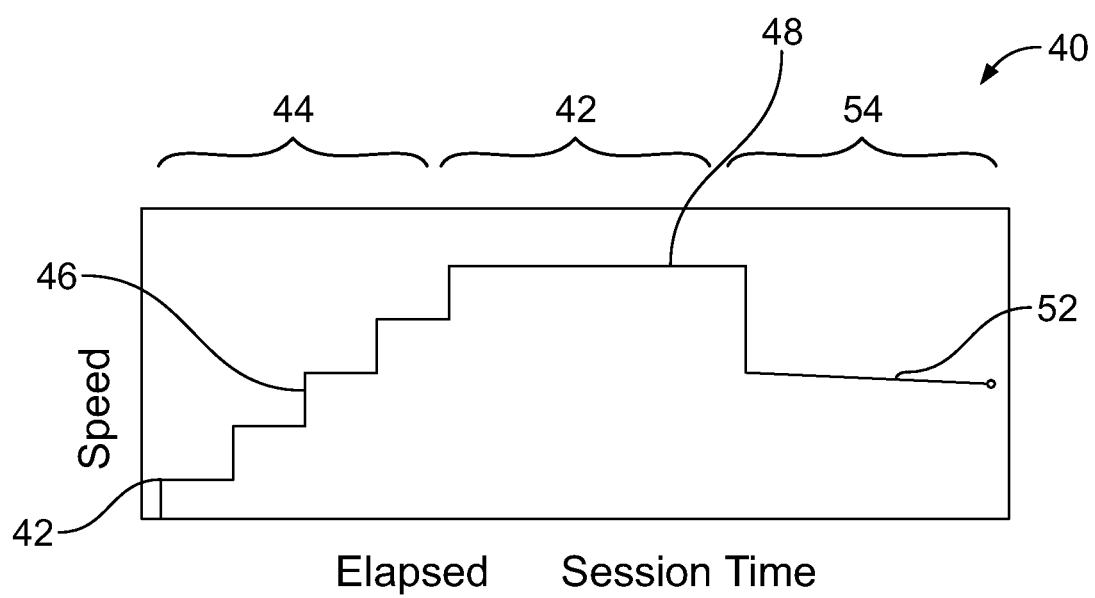

The incremental ramping up of stimuli rigor, as shown for Initial Period 44 in FIG. 2A can be used effectively for training, for example, each stimuli progressively shown with a shorter interval and/or higher speed; however, it has also been found advantageous for assessment to use a step-wise initial period 44, as shown in FIG. 2B, in which more than one stimuli can be presented and engagement performance measured for each incremental step. For example, similar to the initial period 44 shown for FIG. 8, that will be further discussed below.

In the illustrative embodiments, a set rigor 48 level that is constant for plateau period 50 is used; however, in other embodiments the rigor level 48 could vary in the primary and/or secondary changes to stimuli parameters. For example, target complexity or fading/vanishing could be change as a secondary increase in target rigor while the primary parameter that increased during the initial period 44, for example the interval between stimuli presentations, can remain constant. The advantage of the secondary, or both the secondary and primary parameters for stimuli rigor remaining static throughout the plateau period is that during assessment, it is advantageous to collect performance data over a number of stimuli of the same rigor, and during training, it is advantageous for the trainee 22 to become familiar with, adapt to, and obtain mental acceptance and comfort with the heightened target rigor presented during plateau period 50. If during plateau period 50 the target rigor continues to change, as with the initial period 44, then it is believed that the trainee will experience less adaptation and mental acceptance of the heightened stimuli rigor.

Also in the illustrative embodiments, the comfortable rigor 52 level is constant for stimuli presented during the final period 54; however, in other embodiments the comfortable rigor 52 level may vary in the primary and/or secondary changes to stimuli parameters. The advantage of the secondary, or both the secondary and primary parameters for stimuli rigor remaining static throughout the final period 54 is that during assessment, it is advantageous to collect performance data over a number of stimuli of the same rigor, and during training, it is advantageous for the trainee 22 to become familiar with, adapt to, and obtain improving success with the target rigor presented during final period 54 that is elevated over the initial target rigor, for example, to a rigor level of desired successful engagement that is elevated over what the trainee 22 was able to achieve before training.

Figure 3:
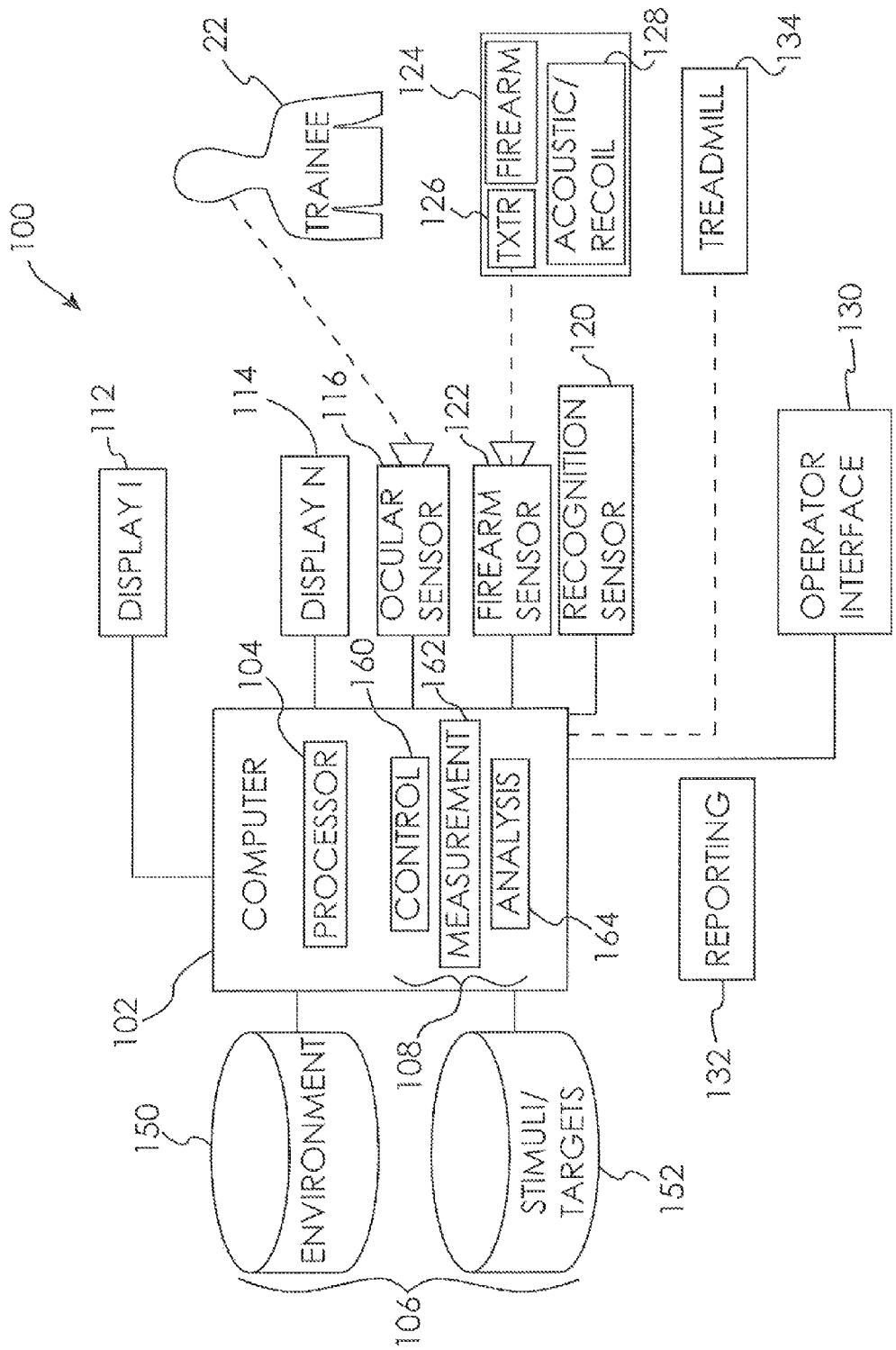
FIG. 3 shows another illustrative system for EOTC according to the present disclosure.

FIG. 3 shows another embodiment of a system 100 for EOTC of trainee 22. The system 100 generally includes a computer or network of computers 102 having one or more processors 104, data 106, and software 108, one to N displays 112 and 114, and an ocular sensor 116 for determine eye gaze and tracking of trainee 22, for example, systems such as those available from SensoMotoric Instruments of Boston, Mass., and SR Research of Osgoode, Ontario, Canada.

The system 100 may also optionally include a recognition sensor 120, for example, capable of registering a trainee's recognition of a target as a threat or non-threat. For example, the recognition sensor 120 may include a simple input switch(es) such as computer mouse buttons used by trainee 22 to register recognition, or an input sensor requiring processing, for example a voice recognition capable of deterring recognition based on a trainee's audible/verbal response.

The system 100 may also optionally include a firearm sensor 122 for detecting the firing and aim of a firearm 120 used by the trainee 22. Firearm 120 can be a simulated firearm, or an actual firearm modified for training use, for example, by replacing the bolt and magazine with a transmitter 126, for example a laser emitter, and a gas discharge device 128 for providing action of the firearm mechanism and simulated acoustics and recoil of firing.

The system 100 may also optionally include an operator interface 130, for example coupled with the computer 102 and providing control of various components of system 100 and/or monitoring of the trainee's performance. The system 100 may also optionally include performance reporting 132, for example visual and/or data output from the computer 102. The system 100 may also optionally include a treadmill 134 to simulate foot travel for trainee 22. Additionally, the system 100 may also include addition sensors 116, 120, 122, operator interfaces 130, firearms 124, and treadmills 134, for example, to support training of multiple trainees 22 simultaneously.

Figure 5:
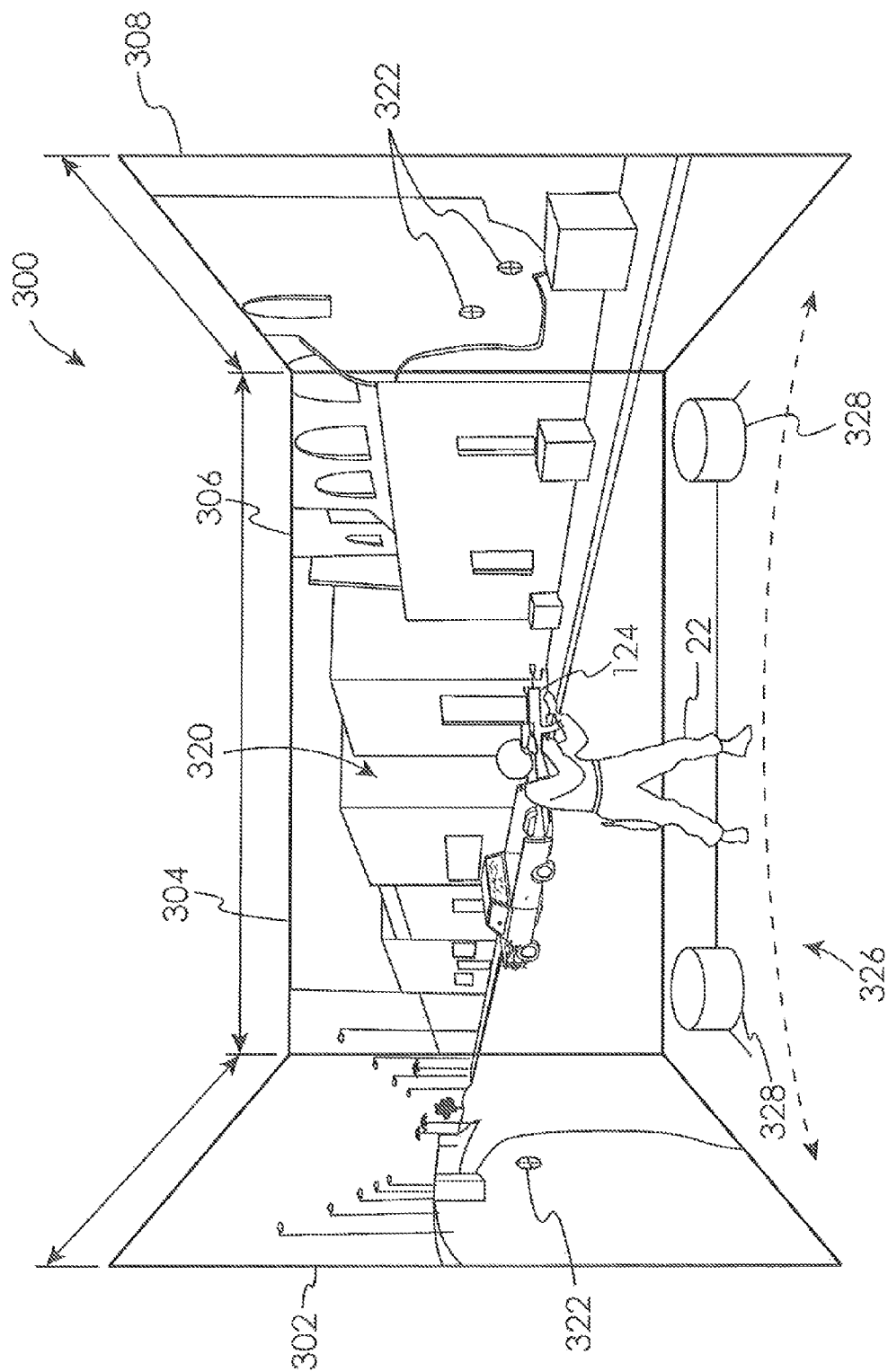
FIG. 5 shows a display portion of another illustrative system for EOTC, for example for TORA training.

Some embodiments of the system 100 include only those components required for the particular and more limited EOTC training scenario, for example, as shown in FIGS. 1 and 2 for Kinetic Saccadic Eye Tracker ("K-SET") training, used primarily to elevate sighting and tracking performance, or for Rapid subject matter recognition ("RSMR") training shown in FIG. 3 used for used primarily to elevate target and non-target stimuli recognition performance. Such embodiments of the system 100 can lack various optional components, for example, the firearms sensor 122, firearms 124, and treadmill 134, and various components of the data 106 and software 108. Other embodiments of system 100 are more robust, would typically include all the components shown in FIG. 3 and support a full range of EOTC training scenarios, for example, such an illustrative system 200, a portion of which is shown in FIG. 5, used for Tactical Ocular Reaction Area ("TORA") training to condition and elevate all aspects of firearms employment and engagement.

Figure 4:
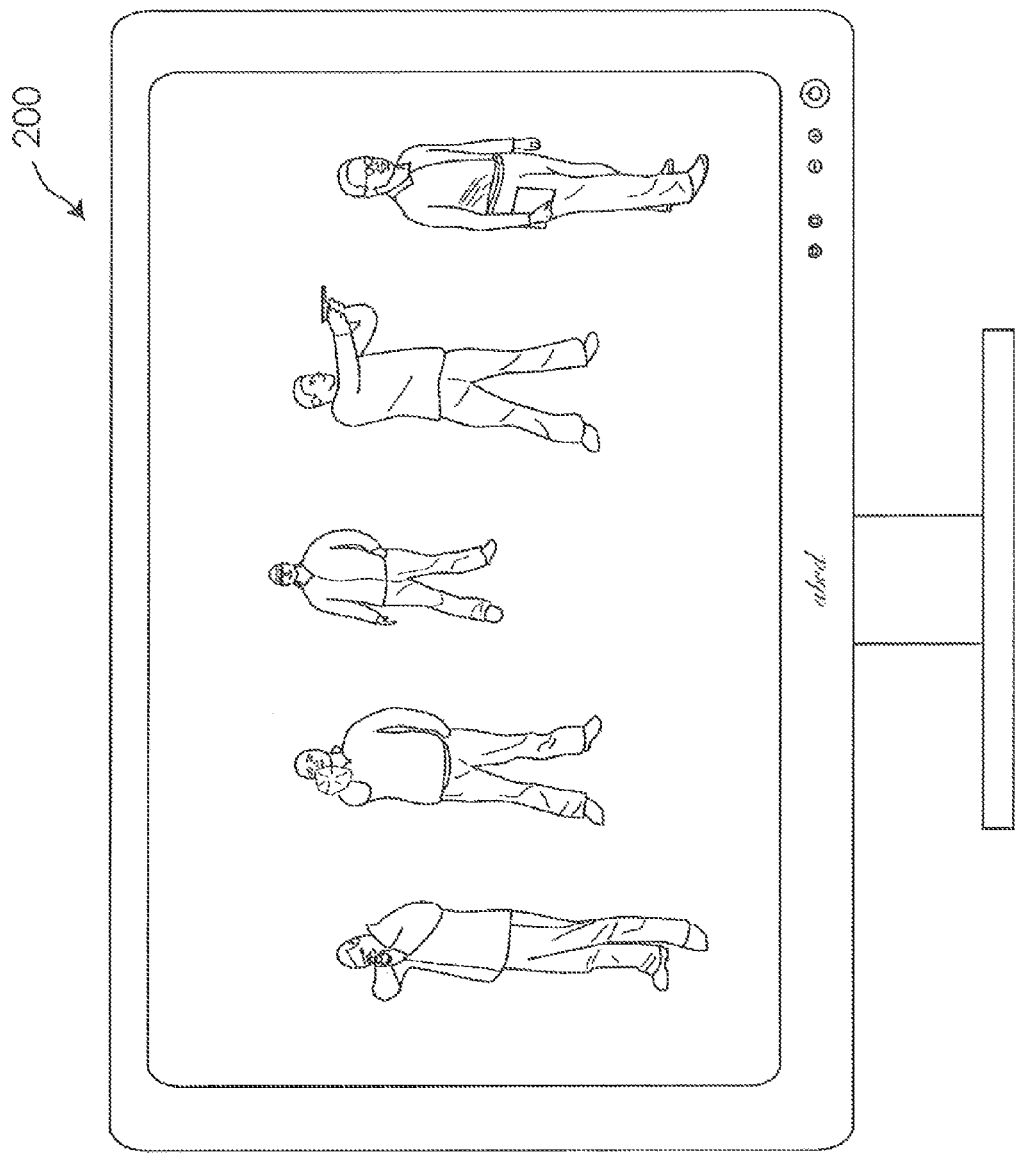
FIG. 4 shows a display portion of another illustrative system for EOTC showing different illustrative images used for RSMR training.
Figure 6:
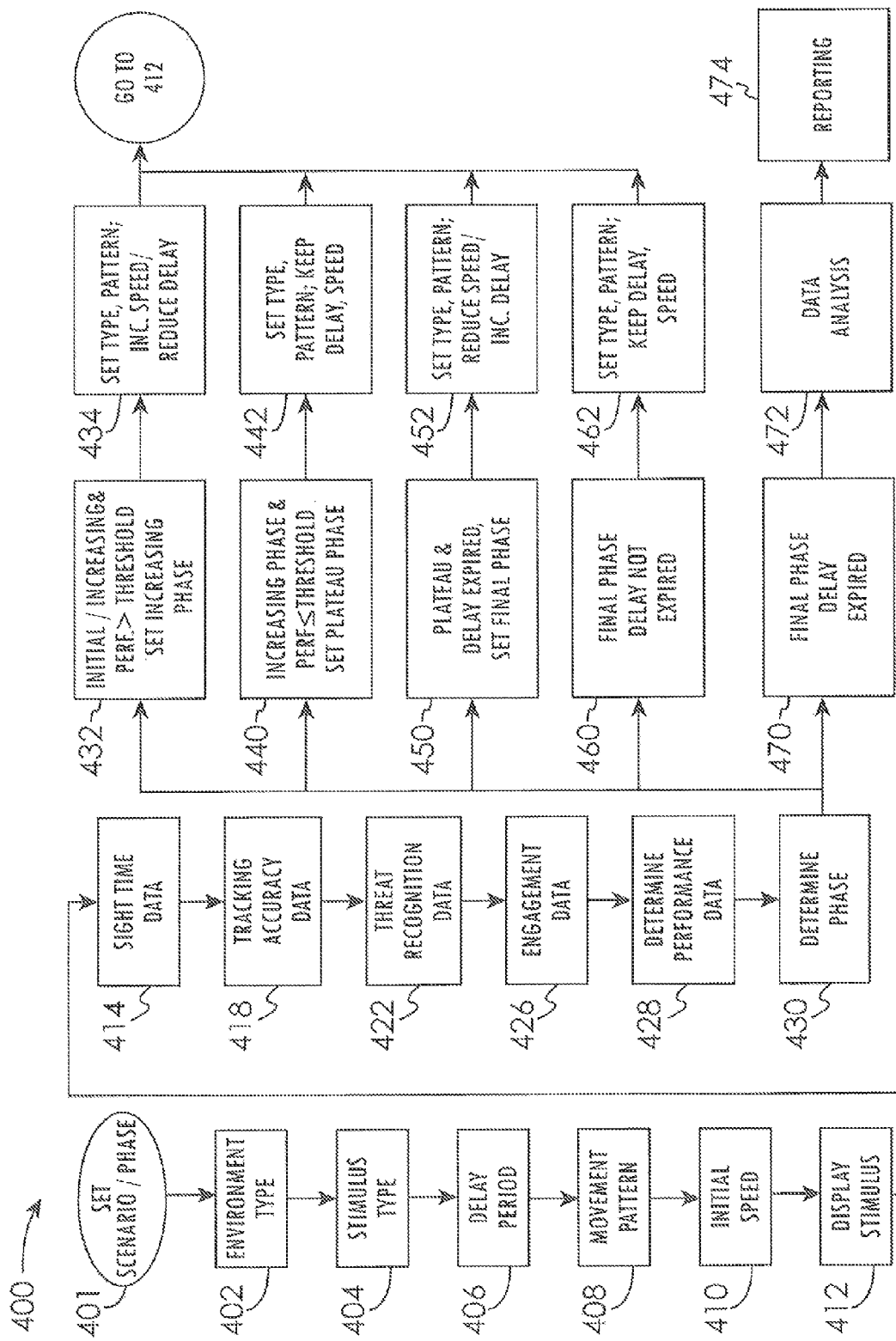
FIG. 6 shows an illustrative process associated with the methods and systems for EOTC according to the present disclosure.

FIG. 6 shows a first illustrative method 400 that can be used with the illustrative systems 20a/b, 100, 200 and 300 for displaying a series of static and/or moving visual stimuli, for example targets, to a trainee for conditioning an enhanced engagement of the stimuli. In this example, the stimuli rigor that is changed is interval time and display period; however, any other parameter of stimuli rigor could be alternatively or additionally changed. In step 401, a Training Scenario is selected and the training Phase set, for example to Initial for some scenarios, or to Final for scenarios using a fixed speed and delay for subsequent targets. In step 402, a display scene or Environment Type is selected and displayed, for example, an empty (blank) scene as shown in FIG. 4, or an urban scene as shown in FIG. 5. In step 404, a Stimulus Type to by displayed is selected, for example a human form with or without a threat, for example a firearm. In step 406, an initial Delay Period from 0 seconds to a present or random length of time is determined. For example, the Delay Period can be used to determine the length of time before a stimulus is displayed, the length of time the stimulus is displayed, or the length of time a particular set of stimulus at a particular speed are displayed. In step 408, an initial Movement Pattern of the stimulus is determined. The Movement Pattern may specify not only the pattern in which a stimulus moves (or does not move), but also the relative displacement or location on the displays 26 and 28 of a stimulus relative to the prior stimulus, for example, as shown in FIGS. 10-15 and further described below. In step 410, an initial Speed of the stimulus is determined, for example, the Speed can be the speed at which a stimulus moves on the displays 26 and 28.

In step 412, the stimulus is displayed to a trainee according to the Stimulus Type, Delay Period, Movement Pattern, and Speed. For example, during the initial Delay Period the stimulus may be not displayed, or the stimulus may be displayed but remain static relative to the trainee. For the initial Movement Pattern, for example, the stimulus may move in a straight line relative to the trainee, for example, moving along a horizontal axis at substantially fixed distance relative to the trainee, or may be a fixed, non-moving stimulus. The initial Speed and/or Delay Period are generally selected as a relatively easy speed for the trainee to sight and visually track the stimulus, for example, movement at 10 degrees/second or subsequent stimulus at 1.5 seconds intervals.

In step 414, it is determined how long the trainee took to sight the stimulus. In step 416, Sight Time data is stored relating to the time it took the trainee to sight the stimulus. In step 418, it is determined whether the trainee remains focused on (tracks) the stimulus. In step 420, Accuracy data is stored relating to the trainee's accuracy in tracking the stimulus. Optionally, in step 422, it is determined whether the trainee properly recognizes the stimulus, for example as a threat or non-threat. In step 424, Recognition data is stored relating to the trainee's recognition of the stimulus. Optionally, in step 426, it is determined whether the trainee properly engages the stimulus, for example, accurately fires at the stimulus. In step 424, Engagement data is stored relating to the trainee's engagement. Optionally, in step 428, Performance data is determined as a function of Sight Time, Accuracy, Recognition, and/or Engagement data.

In step 430, the Phase of the training scenario is determined, for example, Initial, Increasing, Plateau, Final, or Complete.

If the present Phase is determined to be Initial or Increasing and either Performance is greater than a preset Threshold, or rigor is less than a preselected level, then in step 432, the Increasing phase is set. In step 434, a subsequent Delay Period, Stimulus Type, Movement Pattern, and Speed is determined for the Increasing Phase. For example, as shown in FIGS. 2A and 2B, the Speed of the stimulus movement may be steadily increased for each subsequent display, for example, movement in increments of 10 degrees/second. Additionally or alternatively, the Delay Period may be steadily decreased for each subsequent display, providing a short and short time interval during which a stimulus is displayed, for example, in increments of 0.25 seconds. After step 434 is completed, the method returns to step 412 to display the subsequent stimulus.

If in step 430 the present Phase is determined to be Increasing and either the Performance is equal to or less than Threshold, or rigor is equal to or greater than a preselected level, then in step 440 the Plateau phase is set.

If the present Phase is Plateau and a present Plateau Delay has not yet expired, for example, 45 seconds or a present number of subsequent stimuli, then in step 442 the subsequent Stimulus Type and Movement Pattern are determined and the Delay Interval and Speed remain the same. After step 442 is completed, the method returns to step 412 to display the subsequent stimulus.

If the present Phase is Plateau and a present Plateau delay has expired, then in step 450 the Phase is set to Final. In step 452, the subsequent Stimulus Type and Movement Pattern are determined and the Delay Interval and Speed are set to a selected level that provides a higher Performance than the trainee achieved in the Plateau Phase. For example, stimulus speed/frequency in the Final Phase may be selected by the operator based on the trainee's performance, or may be calculated as a function of performance and/or other data collected during the session. For example, the Final Phase stimulus speed/frequency can be selected to be greater than the Initial Phase speed/frequency and less than the Plateau Phase speed/frequency; for example, the Final Phase stimulus speed/frequency can be a percentage of the Plateau Phase speed/frequency or relate to a goal speed/frequency for the trainee. After step 452 is completed, the method returns to step 412 to display the subsequent stimulus.

If the present Phase is Final and a present Final Delay has not yet expired, for example, 30 seconds or a present number of subsequent stimuli, then in step 460 the subsequent Stimulus Type and Movement Pattern are determined and the Delay Interval and Speed remain the same. After step 460 is completed, the method returns to step 412 to display the subsequent stimulus.

If the present Phase is Final and a present Final Delay has expired, then in step 470 training is complete and final data analysis and reporting is completed.

For example, as shown in FIGS. 2A, 2B, and 3, a single Stimulus Type and Movement Pattern may repeated but an incrementally increasing Speed and/or reduced Delay Period applied until the trainee's Performance drops below a selected Threshold. After reaching the Threshold, the Speed/Delay Period combination can be maintained for a present Plateau Delay, then the Speed is reduced and/or the Delay Period lengthened to provide a higher Performance and that Speed/Delay Period maintained for a present Final Delay.

The Environment and the initial and sequence of subsequent Stimulus Types, Delay Periods, Movement Patterns, and Speeds may be predetermined by the Training Scenario selected in Step 400. Alternatively or additionally, one or more of these variables may be determined by the trainee's Performance. Alternatively or additionally, one or more of these variables may be determined by an Operator, including in response to the trainee's Performance during the scenario.

K-SET: Kinetic Saccadic Eye Tracker

An embodiment of the illustrative system 100 and the illustrative method 400 can be used to implementing K-SET training, which is used primarily to elevate sighting and tracking performance of the trainee 22.

For example, referring to FIGS. 2A and 2B, a 2-minute K-SET session can be performed by using an increasing period 44 lasting about 45 seconds, a plateau period 48 lasting about 45 seconds, and a filial period 54 lasting about 30 seconds. The displays 112 and 114 used for the K-SET session can be, for example, high refresh rate 52 inch plasma flat-panel monitors. Computer 102 can be a standard PC type computer having an operator interface 130 consisting of, for example, a keyboard, pointing device, and monitor.

The displays 112 and 114 are arranged as shown for displays 26 and 28 in FIG. 1, abutted end to end, the faces of the displays forming an obtuse angle, the interior of which faces the trainee 22. The angle of the display faces and the trainee 22 position relative to the displays 26 and 28 (112 and 114) can be such that the trainee 22 can track targets 24 and 34 through 180 degrees or more motion. For example, the trainee may be positioned approximately 18 inches from the displays 26 and 28.

Saccades are used to bring the eye rapidly from one point of regard to another. Because the eyes do not see during a saccade, it is best to get them over as quickly as possible. Accordingly, saccades typically move at speeds between 200 and 600 degrees/sec—for 300 deg/sec, to move gaze 90 degrees, it takes about ⅓ seconds, which is a long time not to see when in a threat environment.

K-SET enhances performance in various ways. For example, trainee 22 is conditioned to keep the eyes open and focused throughout the motion patterns 30 and 30 of the targets 24 and 34. Benefits of this conditioning include, for example, increasing visual awareness of soldiers and law enforcement officers in clearing rooms, engaging multiple targets in close quarters, and in high speed pursuits and the like. The conditioning also strengthens the muscles in the eyes so that the speed at which the trainee 22 can focus on multiple objects in an urban warfare situation is increased.

Optionally, the trainee 22 can walk on a treadmill 134 (FIG. 3) in front of the displays 112 and 114 in order to condition sighting and tracking during "smooth pursuit". Additionally or alternatively, the speeds of subsequent targets during a K-SET session can be set to increasing and decreasing speeds. For example, ten target velocities (ranging from 10 to 100 deg/s in 10 deg/s increments) presented in random order with each target velocity being repeated 20 times.

An operator using operator interface 130 can manually begin and can manually control the type of targets and the speed and interval between targets. For example, the type of target displayed can be fixed as a ball or be selected from other objects or shapes and subsequently varied.

The software 108 uses a comparison of the location of the target 24 or 34 on the displays 26 and 28 and data collected from the ocular sensor 116, which indicates the gaze and track of the trainee's eyes, to determine whether the trainee 22 is focused on and tracking the target 24 or 34 or is not able to track the target 24 or 34. The software 108 determines and collects data relating to the trainee's accuracy in tracking the target 24 and 34.

The adjustments in the subsequent target speed and/or the delay interval between targets can be automatically set by the software 108 or manually by the operating. For example, adjustments can be determined based on a preset profile associated with the training scenario selected the trainee's accuracy, the trainee's accuracy, or other factors considered by the software 108 or operator; however, all profiles provide subsequent targets at a speed and/or delay interval 48 (FIGS. 2A and 2B) during the plateau period 50 that exceed the trainee's ability to consistently and accurately sight and track, and subsequent targets at a speed and/or delay interval 52 for a final period 54 that the trainee can consistently and accurately sight and track with reasonable comfort.

Figure 7:
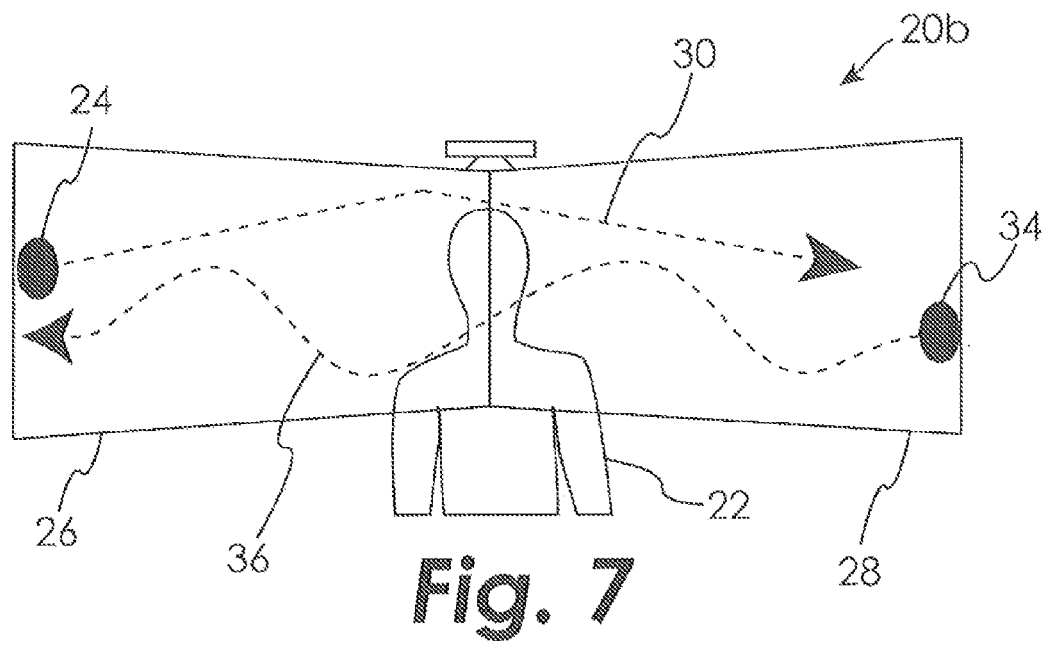
FIG. 7 shows a display portion and illustrative stimuli of another illustrative embodiment of a method and system for EOTC according to the present disclosure, for example for K-SET training.

Additionally or alternatively, as shown in FIG. 7, in an illustrative system and method 20b, the movement patterns 30 and 36 (and patterns of subsequent targets) can include patterns other than a straight line, for example, angled, arcing, and/or complex patterns. The presentation of patterns can be random, pre-defined, based on performance of the trainee, or selected by the operator.

Additionally or alternatively, the patterns associated with the illustrative system and method 20b can in the targets 30 and 36 making random path changes, that include immediate or gradual changes of direction at angles such as 36, 45, 90, 126, and 180 degrees, and/or the targets 30 and 35 stopping movement and subsequently restarting movement.

Additionally or alternatively, the illustrative system and method 20b can include images flashed on the displays 26 and 28 to condition recognition/situation awareness. For example, the method may include the trainee 22 providing a different responses using recognition sensor 120, for example, the switches on a computer mouse. For example, if a displayed image includes a person holding an object of threat, for example a firearm, the trainee 22 is instructed to press the left mouse button immediately upon recognition, or the right mouse button if there is no threat. The trainee may also be asked questions regarding physical features of the image/person to help condition situational awareness.

RSMR: Rapid Subject Matter Recognition

An embodiment of the illustrative system 100 and the illustrative method 400 can be used to implementing RSMR, which is used primarily to elevate target and non-target stimuli recognition performance. As with K-SET discussed above, the target and non-target rigor can be directed to various parameters, including speed of movement, interval time for targets/non-targets (between initiating of target/non-target displays or rest time between target/non-target displays), time period of display of target, size, opacity, contrast, color, fading/vanishing, symbology, complexity, and display location. Referring to FIGS. 2A and 2B, in this example, RSMR conditioning is performed by using an increasing period 44 lasting about 45 seconds, a plateau period 48 lasting about 45 seconds, and a final period 54 lasting about 30 seconds. The embodiment of system 100 for completing RSMR conditioning can be, for example, the same embodiment as described for K-SET conditioning above, including the arrangement of plasma displays 26 and 28 shown in FIG. 1.

For example, referring to FIG. 4, the illustrative system 200, can be used for RSMR conditioning in which the software 108 displays human images, for example, a single actor filmed and or photographed in numerous images of varied positions, but wearing the same clothes, with some images presenting various levels of threat, for example holding a firearm, and other images not presenting a threat.

Figure 8:
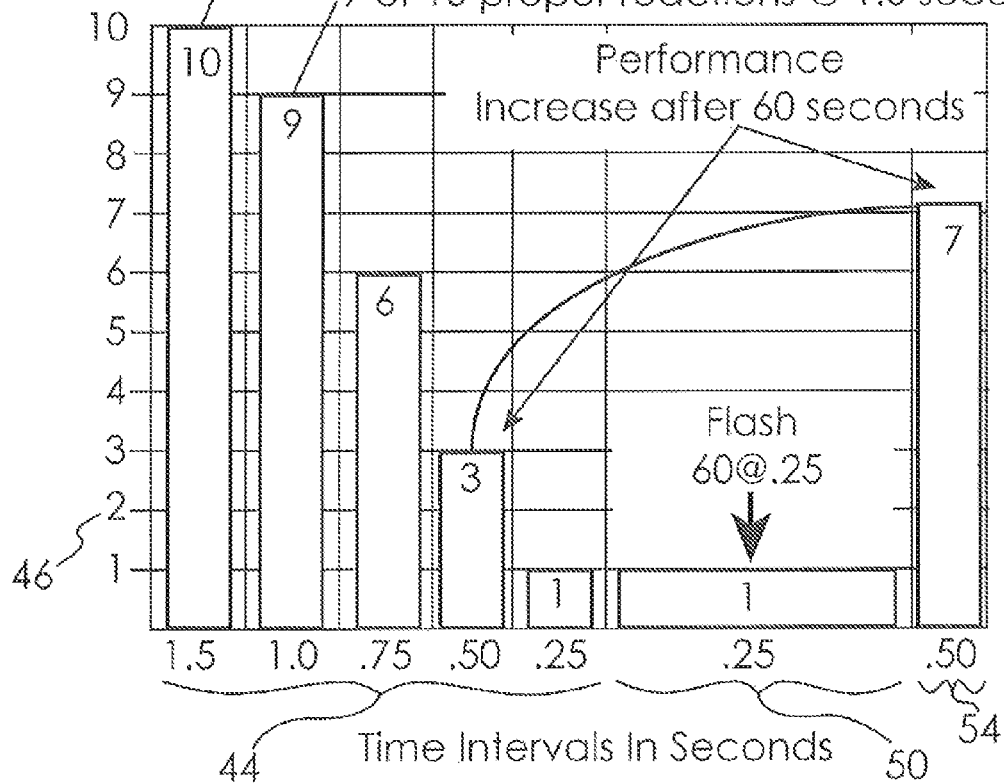
FIG. 8 shows an illustrative training scenario and results associated with the methods and systems of the present disclosure.

Referring to FIGS. 2 and 8, the speed of movement of the stimuli in the RSMR is the time interval for which the images are displayed. For example, the display interval can begin at an initial interval of 1.5 seconds and the interval incrementally decrease (speed at which new images are displayed increases) during the increasing phase 44, for example to a 0.25 seconds interval during the plateau phase 50, and then to 0.50 seconds interval during the final phase 54. As with K-SET, the trainee 22 can provide an input to the recognition sensor 122 (FIG. 3), for example a particular button on a computer mouse button, depending on whether an image presents a threat or not. The elevating speed methodology is used to condition the brain to function at elevated speeds. Additionally, as with K-SET, the target images can be stationary or moving, and subsequent images can be angular displaced from prior images.

As shown in FIG. 8, by using progressively increasing speeds during the increasing phase 44, for example, interval times of 1.5, 1.0, 0.75, 0.50, and 0.25 seconds, after reaching 0.25 seconds, the trainee's performance accuracy below a preset threshold 46, for example, only 10%, or alternatively, the speed or other rigor is equal to or greater than a preselected level. During the plateau phase 50 additional images are flashed, for example, at a rigor level that is above that typically achieved by a professional firearms shooter, known as a "plus life" speed/rigor, for example, 25% above that typically achieved by a professional firearms shooter. Or, for example, a target rigor level that is above the desired goal for the trainee, for example, 25% above the desired rigor level for the trainee 22. For example, an additional 60 images are flashed for 0.25 seconds each during the plateau phase 50.

The final phase may be at a level between the initial display interval and the plateau period level, for example, at a level of rigor for which the trainee 22 is expected to experience an improved accuracy of two or three times that experienced at the same speed during the increasing phase 44, for example, at an interval of 0.50 seconds. For example, in the hypothetical results shown in FIG. 8, the trainee's accuracy at 0.50 seconds interval increases from 30% to 70%. Additional measurements made by the system 100 may include parameters such as reaction time, saccadic accuracy, saccade-evoked blinks, and eye velocity.

Figure 26:
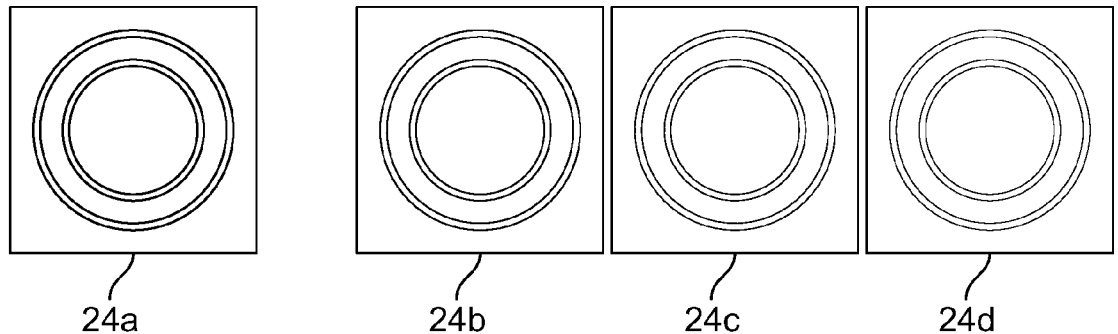
FIGS. 26 and 27 show illustrative fading and vanishing targets that can be used with the systems, methods, and scenarios disclosed herein.
Figure 27:
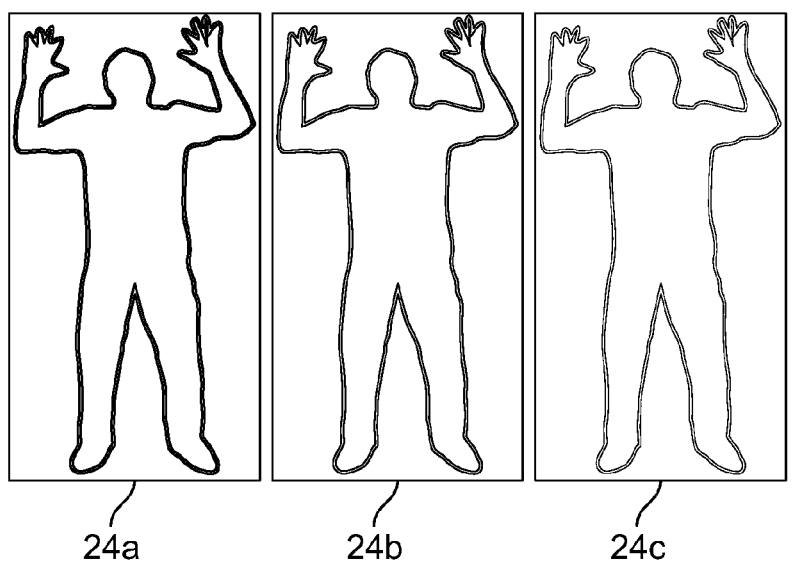

Target or other stimuli parameters such as size, opacity, contrast, brightness, color, fading/vanishing, symbology, complexity, and display location can also be varied to provide target rigor for any of the above and below discussed training types, scenarios, and methods. For example, vanishing or fading of a target by changing opacity, contrast, color, or brightness can increase target rigor. Referring to FIGS. 26 and 27, a time sequence illustrates two such fading and vanishing targets 24a, 24b, 24c, and 24d for which the target brightness, or contrast with the background is progressively reduced over time.

The fading, optionally to include vanishing, of a target can occur either during each individual stimuli presentation or as training progresses across a set of stimuli that are presented. For example, a target that is first displayed in the periphery of the trainee, for example, between 45 to 85 degrees from center, can be first displayed at full brightness and/or color, and the brightness and/or color fade to cause the target to vanish from view after a brief period of time, thus teaching the trainee to quickly engage targets, include distinguishing between target and non-target stimuli.

TORA: Tactical Ocular Reaction Area

An embodiment of the illustrative system 100 and the illustrative method 400 can be used to implementing Tactical Ocular Reaction Area ("TORA") condition, which is used to elevate all aspects of engagement, for example, engagement of targets with firearms. TORA can utilize a sequence of conditioning drills scenarios, for example, the various illustrative drills discussed below.

The illustrative scenarios were developed to locate and otherwise present the targets in a way that conditions heighten vision, physical reaction, economy of motion, and mental acceptance of elevated target rigor against single and multiple target engagements. In the TORA phase trainees engage hundreds of targets, often from unfamiliar, uncomfortable and challenging angles. Trainings escalate in difficulty with no ceilings. As trainees excel in one sequence, target rigor increases, for example, speeds will increase and target size will decrease, arm weights, hand weights, wobble boards, treadmills, and stimuli are added to create an even faster more focused trainee 22.

An illustrative embodiment of the system 100 for TORA conditioning is the TORA system 300 shown in FIG. 5. In system 300, the displays 112 and 114 typical of system 100 include one or more projectors (not shown) and projection screens 302-308. For example, PT-5600 UL projectors with ET DLE 50 short throw lenses available from Panasonic, Secaucus, N.J. can be used to project environmental images 320 and targets 322 against a surface, for example, prepared, flat, interlocking screens or walls measuring approximately 10 feet by 10 feet. Typically, a projector would be associated with each of the screens 302-308. However, non-flat surfaces, varied dimensions, rear projection, and other techniques and/or additional and/or alternative display features known in the art may be utilized.

An interior area 326 within which the trainee 22 may move and employ the firearm 124 is generally defined by the perimeter of the screens 302-308. For example, the trainee 22 is circumscribed by screens 302-308 by at least about 220 degrees; however, the system 300 may provide screens that are aligned to form a flat place, a lower angular view, or may circumscribe the trainee by a full 360 degrees. Additionally, display of environmental scenes 320 and targets 322 may extend above normal ceiling heights and below the normal floor plan, for example, extended by an additional 10 foot in the vertical above or below one or more of the screens 302-308 by associating additional screens (not shown) with the system 300. Such vertical extensions can also be angular, circumscribing the trainee 24, or arranged in a flat plane. The area 326 may also include environmental objects, for example obstacles 328 and one or more treadmills 134 (FIG. 3).

Firearm 124 can be a standard firearm, for example semi-automatic handgun, rifle, or other combat arms, weapons, or tools, reversibly modified to remove live firing and add a transmitter 126, for example a laser emitter, and optionally a gas system 128 for simulating mechanical action, recoil, and acoustics associated with live fire. For example, transmitters 126 and gas systems 128 available for reversibly modify firearms 124 from Dvorak Instruments of Tulsa, Okla.

The firearm sensor 122 for detecting and locating the laser shot fired by firearms 124 on screens 302-308 may be one or more area scan cameras directed at the screens 302-308, for example, model number A602 available from Basler Vision Technologies of Exton, Pa., used with a visible light filter lens to remove environmental or background images and isolate the laser light projected by firearm transmitter 126. Processing and analysis of the targets 322 and measurement and performance relating to shots against them using the firearm 124 may be facilitated by the software 108 identifying and utilizing subdivisions within each screen 302-306. For example, software 108 can divide each screen 302-308 into four equal quadrants (not shown) to facility mapping, measuring, and analyzing target sequences and performance. For example, the relative displacement of sequential or simultaneous targets from one to another adjacent or non-adjacent quadrant may be used to determine a measure of difficulty associated with successfully engaging both targets.

Targets displayed with the environmental scene images may be digitally added and projected by the above described projectors (not shown) of displays 112 and 114, or may be separately displayed on screens 302-308, for example, using one or more separate motorized projectors (not shown). Advantageously, comparison of location and expanse of targets 322 on screens 302-308 and the projection location on screens 302-308 of the laser fired by firearm 124 (as captured by sensor 122) is used to determine the time to react and engage and the accuracy of shot, including a hit or miss.

Figure 9:
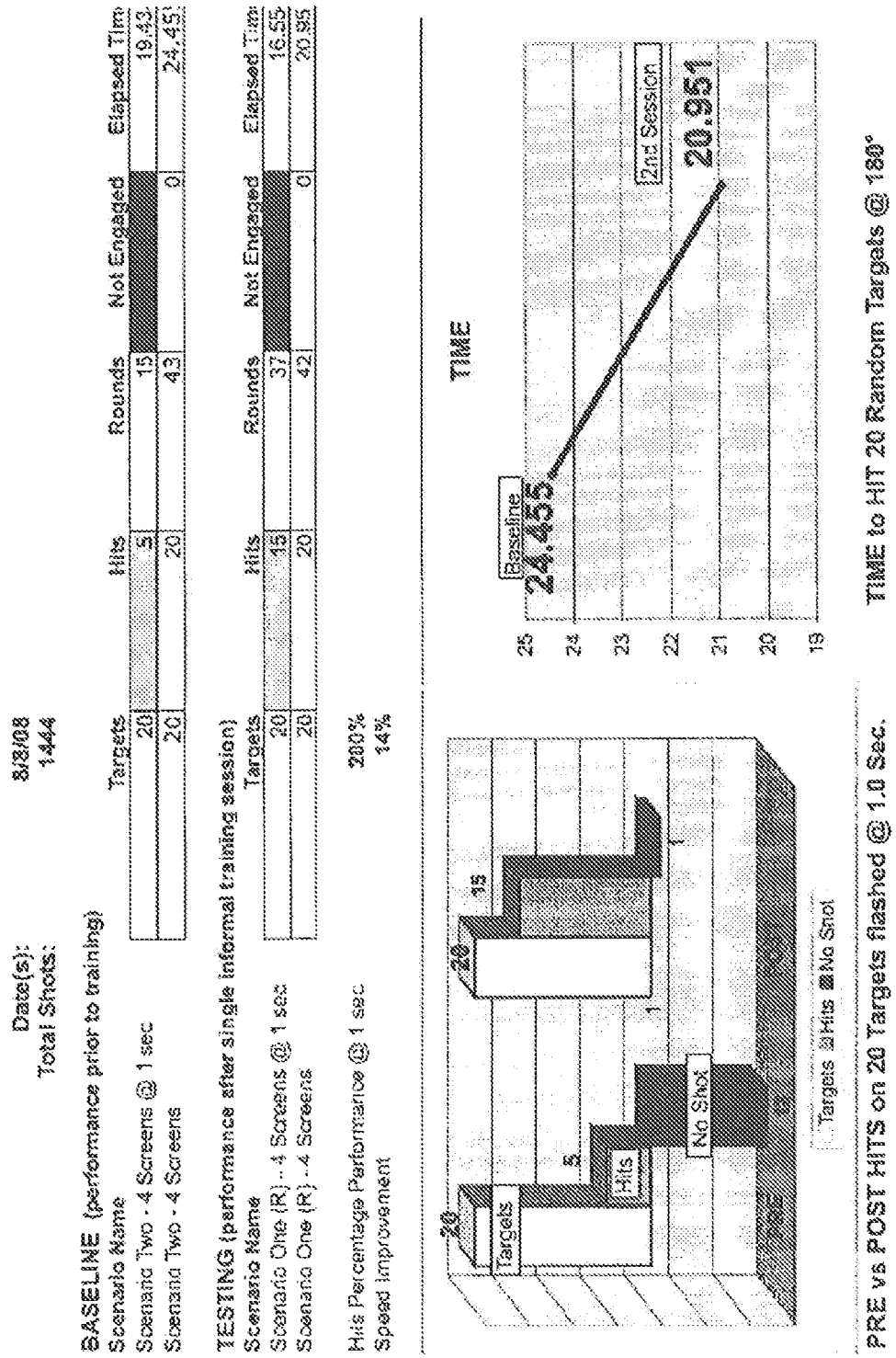
FIG. 9 is an illustrative report produced by the methods and systems of the present disclosure.
Figure 28:
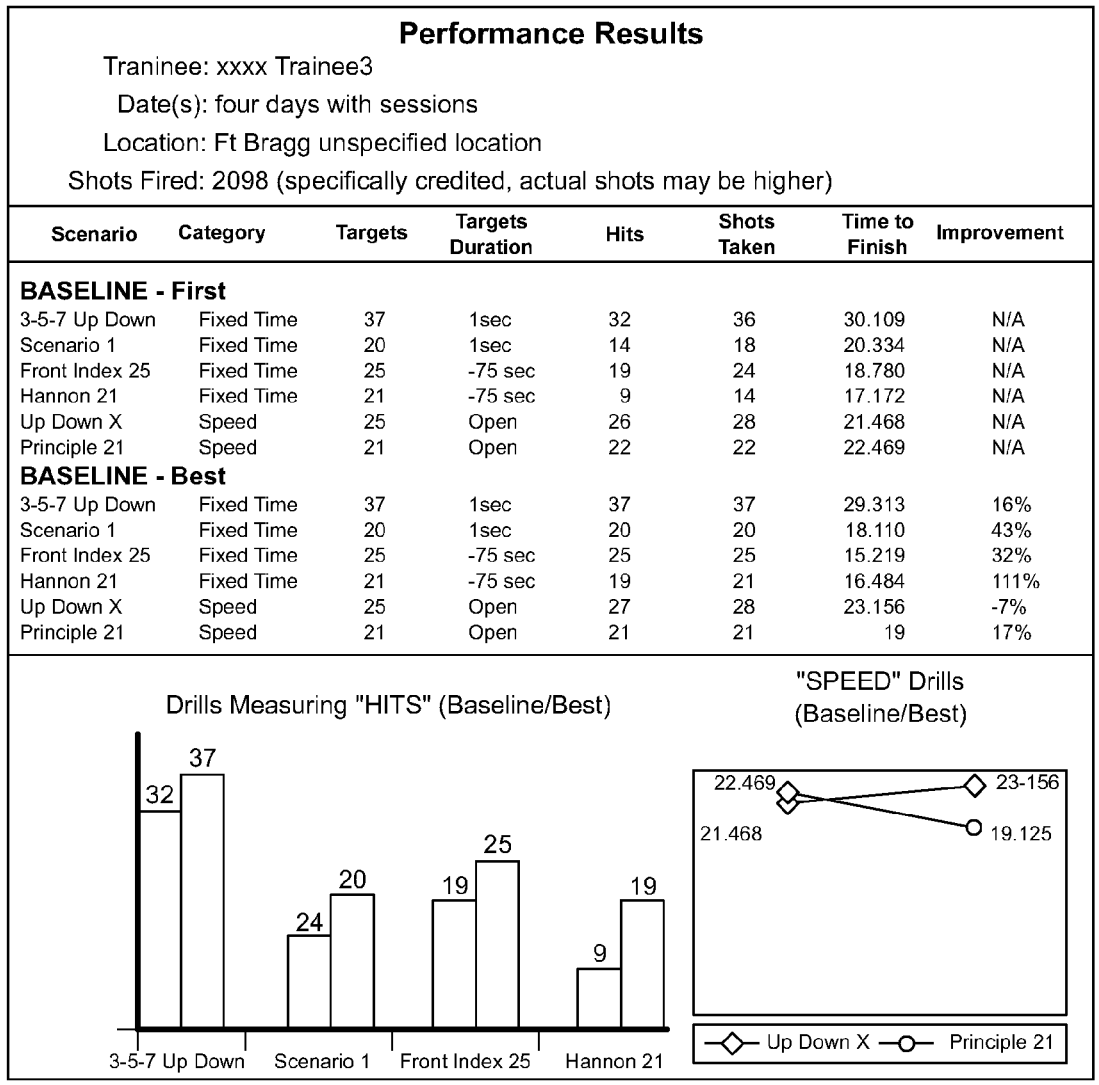

In the illustrative embodiment 300 of system 100, computer 102 may include multiple networked computers (not shown) to manage the components and processing of the system. Additionally, or alternatively, a WAN (not shown) such as the internet may be used to provide remote processing power or service of the data 106 and software 108. The data 106 includes an environment database 150 for projecting images 320, for example stills, video, or graphically rendered images of background scenes. The data 106 also includes a stimuli or target database 152 for projecting targets 320, for example stills, video, or graphically rendered images of threat and non-threat people, vehicles, and the like. The software 108 executed by the processor 104 includes control software 160 for displaying scenes 320 and targets 322 and for providing the training scenario, such as method 400 implementing the below described scenario drills. The software 108 also includes measurement software 162 to facility capture and processing of data, for example, from sensors 116, 120, and 122. The software 108 also includes analysis software 164, for example, for analyzing captured scenario and performance data and producing reporting 132, for example, the illustrative TORA Performance Report shown in FIGS. 9 and 28. Additional reporting may include, for example, a listing of trainee ID, scenario ID, firearm ID, timestamps, targets presented, targets hit, "rounds" expended, targets not engaged, elapsed time, and other scenario and performance data and analysis, including for example aggregate, average, and improvement in performance data, including translating data collected by system 100 in order to provide the types of data, units, and reference for reporting forms generally utilized in traditional/prior art firearms training, for example, as shown in FIGS. 29 and 30, and including standard shooter cards such as that shown in FIG. 31, including calculation of ratings for a trainee. The software 108 may include adapted commercially available software, for example MATLAB for various functions of measure software 162 and Microsoft Excel for various functions of analysis software 164.

Figure 32:
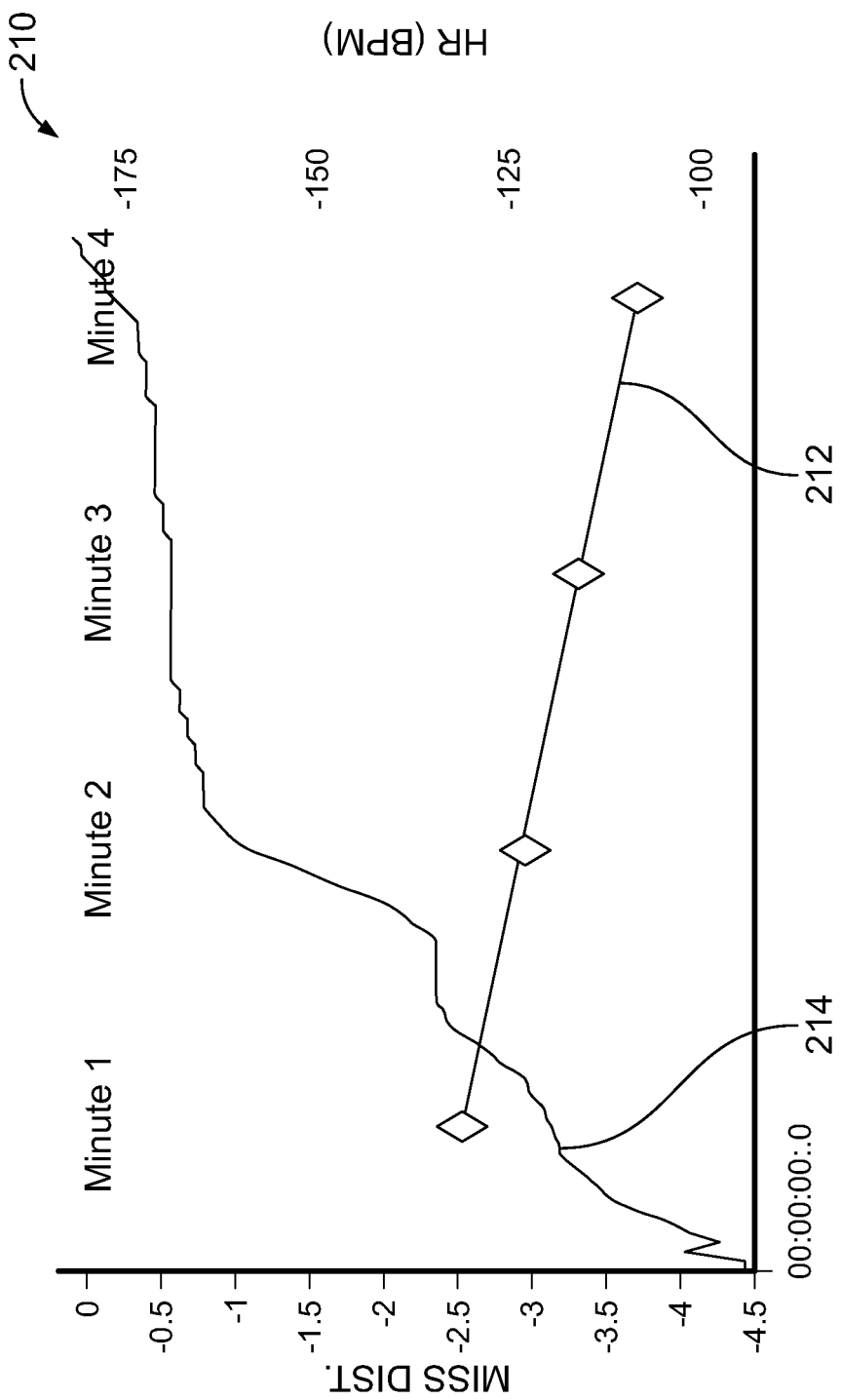

Referring to FIG. 32, an example report 210 provided by system 100 or another data processing device or system includes a data graph illustrating the results of targets engaged during or in between elevated heart rate activity, for example, using a treadmill. For example, the illustrated report example provides time along the X-axis, miss distance along the left Y-axis for the miss distance trend plot 212, and heart rate along the right Y-axis for the heart rate trend plot 214. Such data and report is helpful in a trainer and trainee understanding how activity and/or the resulting heart rate impact firearms performance for the trainee 24.

Figure 33:
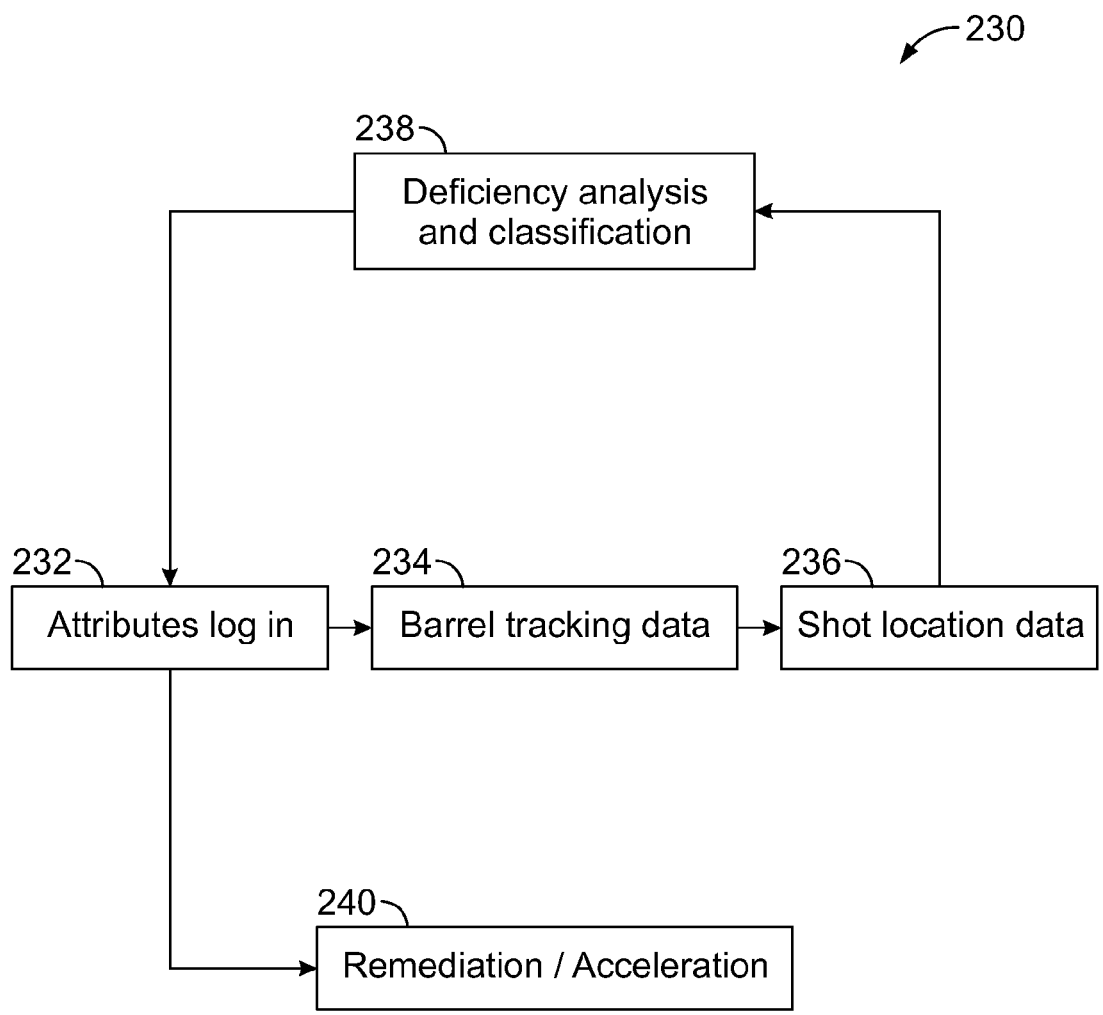
FIG. 33 shows an illustrative process of training that that identifies and remediates deficiencies and can be used with the systems and scenarios disclosed herein.

To further facilitate assessment and provide corrective instructions in firearms handling/mechanics and scenarios tailored to each trainee 24, the process 230 shown in FIG. 33 and implemented at least in part by system 100 or another data processing device or system, can be utilized to evaluate a trainee. In step 232, a trainee's profile, especially data relating to the trainee's firearm attributes, are provided, either by entry, or by accessing from a database of system 100 if attributes were previously captured for a specific trainee 24. For example, attributes can include trainee physical attributes, firearm attributes, trainee's firearm use attributes, and trainee's past training and performance history. Additional attributes relating to firearms and the trainee's use of and training with such firearms can also be included. Referring to FIG. 34, an illustrative input screen layout 250 illustrates the type of trainee attributes that can be collected, including, for example, name, age, weight, height, standing/rest heart rate, dominate hand, lead hand placement, dominate eye, sighting technique, butt stock placement, shooting stance, and type of firearm sights.

Referring again to FIG. 33, in steps 234 and 236, as the trainee engages targets in a scenario, data about the trainee's engagement of each target can be captured. For example, such data can include aspects of the trainee's use of the firearm in engaging each target. For example, in steps 234, barrel tracking data, for example, barrel path collected based on the trace of an always on laser transmitter 126, or a motion sensor on firearm, or observations of a trainer observing the trainee, for example, regarding their firearms handling during sighting and firing on a target.

In step 236, data about the trainee's shot against each target is captured. After a single or a series of targets in a scenario are completed, in step 238, a trainer performs a deficiency analysis and classification that seeks to identify sources of deficiencies and corrective actions and/or training drills that can improve the trainee's firearms skills. Significantly, the analysis in step 238 incorporates consideration of the trainee's attributes profile. For example, experienced trainers, including the trainer's observation of data trends identified from data collected by system 100 over numerous trainees, can identify deficiencies, best corrective actions, and/or best training drills that are associated with a particular attribute or combination of attributes for the trainee 24.

For example, the trainer, through experience and/or data trends identified from data collected by system 100, may recognize that a particular deficiency in performance identified in the process 230 is best remediated by a change in firearms handling and/or by performing a particular set of drills. For example, some assumptions to correct trending to a particular offset from the target are widely known in the art, for example, shooting low and left may be from a non steady trigger or early reaction to the shot. A further example, if a particular trainer is slow to fire on targets, the trainer may recognize that the trainee is using a combination of a firearm sight and sighting technique which leads to a trend of lower performance, and thus make the assumption that this firearms technique may be the source of the deficiency and instruct the corrective action of the trainee be to change one or both of the firearm sight and sighting technique to avoid the combination that trends toward lower performance.

Figure 35:
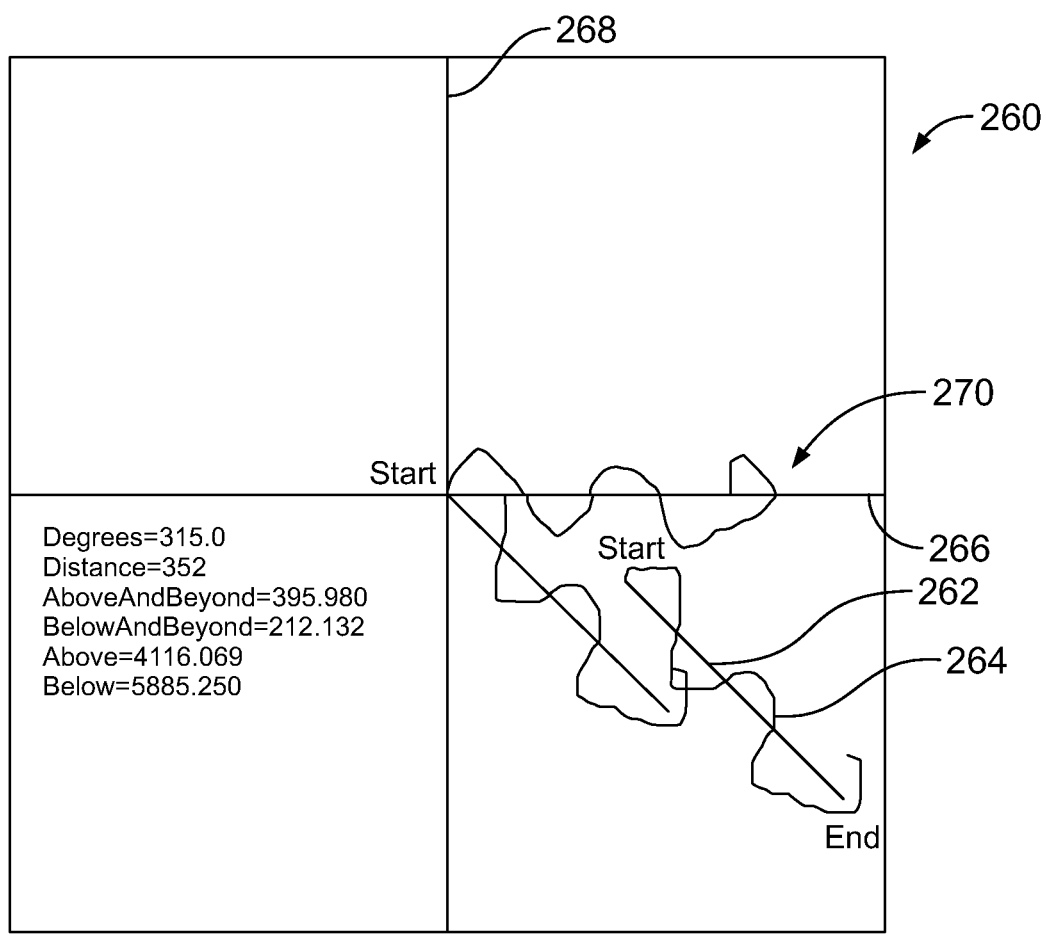
FIG. 35 shows an illustrative barrel tracking report layout associated with the process of FIG. 33 and the systems, methods, and scenarios disclosed herein.

As a further example, referring to FIG. 35, the movement of the barrel path can be tracked and captured using the location over time of the laser spot on the displays 302-308 that is generated by an always on laser transmitter 126 on the firearm 124 and displayed in an illustrative barrel tracking report 260. As shown in FIG. 35, the actual barrel path 264 always deviates from the straight line path 262 from the barrel and resulting laser location upon a target being presented and the barrel and resulting laser location upon the trigger of firearm 124 being squeezed. While some deviation is normal for human target engagement, trends can be identified. For example, a particular trend, for example, an overshoot of the target just before firing, may be associated with particular eye dominance and sighting techniques; however, if such a deviation trend is identified for a shooter without that associated eye dominance and sighting technique, than a different assumed source of the deficiency may be identified and remediated by an experienced trainer. If such data as barrel tracking is not collected and analyzed, and correlated with other trainee profile attributes and shot performance, then such deviation trend may be overlooked even by an observant experienced trainer. Barrel tracking data, as shown in FIG. 35, may include calculating the degrees and distance translated, normalizing the data relative to an axis 266 and 268 to provide a normalized path 270, and calculating the area between an ideal movement 262 and the actual movement 264, for example, above, below, above and beyond the target, and/or below and beyond the target, as shown in FIG. 35. Other data analysis known in the art may also be performed and utilized.

Identification of potential sources of deficiency and corrective remediation and acceleration is much more limited if based on only the shot location data as it does not take into account the individual trainee's profile attributes and/or firearms handling data observed or otherwise collecting during each target engagement.

Such barrel tracking data and associated shot data may also be used in other ways, for example, considering economy of motion (e.g., minimal deviation from ideal movement 262) used by the trainee in engaging targets with the firearm 124. For example, a trainer may recognize a trend that for right hand shooters, engaging targets that require movement of the firearm from right to left is more deficient in economy of motion and/or shot performance for trainees that use an isosceles stance, and a particular trainee has excess deficiency in economy of motion and/or poor shot performance in targets requiring right to left movement of the firearm, the trainer may recommend that the trainee try a weaver stance to improve economy of motion and/or shot performance.

In addition to firearms mechanics, this process 230 may also be used to identify and remediate non-mechanical performance deficiencies. For example, if a trainee 24 is anticipating or guessing that the next target will appear in a particular location, the barrel tracking data will at least occasionally reflect an initial movement in a wrong direction, away from the target, or movement away from the prior target, or away from center before the new target is presented. Such trends can be identified by the process 230 and corrective actions and/or drills selected by the trainer to address the deficiency and improve the trainee's firearms skills.

By way of an additional example, the trainee profile attributes and trainee firearms techniques and deficiencies observed by the trainee or otherwise captured by data collection can include or emphasize key marksmanship fundamentals adopted by a particular organization, for example, steady position, aiming/sight picture, breath control, and trigger squeeze, including attributes and performance relating to these fundamentals. An alternative illustrative group of key marksmanship fundamentals includes shooting stance, grip, sight alignment, sign picture, breath control, trigger control, follow through, and recovery.

In step 240, remediation in the form of a corrective action and/or acceleration in the form of drills that are assumed to address the deficiency is completed and further cycles of process 230 can be completed to verify improvement in the trainee's firearms skills, and/or to identified other potential assumed sources of the deficiency that may provide or further provide improvement.

TORA Illustrative Training Modes

Two training modes may be used to present targets and determine sequencing of targets 322, fixed and open intervals.

For the fixed intervals target mode, a sequence of targets 322 appear for a fixed time interval in predetermined locations on screens 302-308. The targets 322 remain static and then are removed from view after expiration of the fixed interval of time. For example, each of 20 targets appear one at a time in sequence for 1.0 seconds each. Each target remains visible until successfully engaged (fired upon) or until the expiration of the fixed interval of 1.0 seconds.

For the open interval target mode, targets 322 appear in predetermined locations on screens 302-308 and remain displayed until successfully fired upon. After being successfully hit, the subsequent target 322 appears and remains visible until successfully fired upon.

Illustrative TORA Backgrounds

Figure 16:
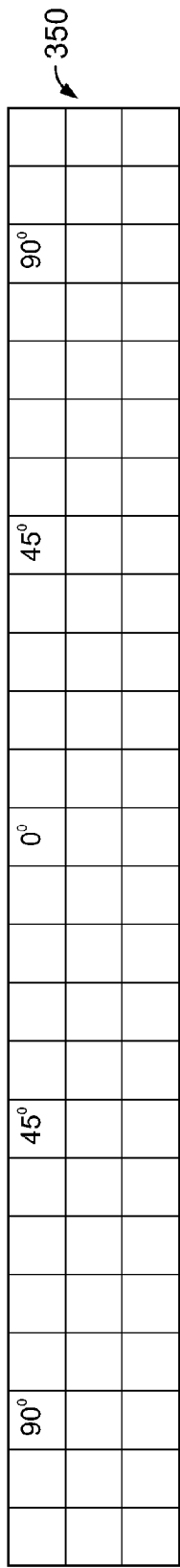
FIG. 16 shows an illustrative grid pattern used with the display system shown in FIG. 7.
Figure 17:
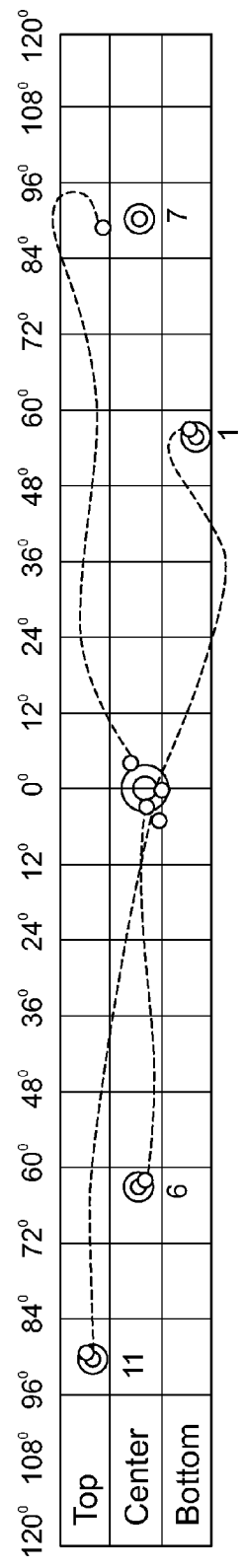
FIGS. 17 and 18 show illustrative target patterns presented on the illustrative grid pattern of FIG. 16.
Figure 18:
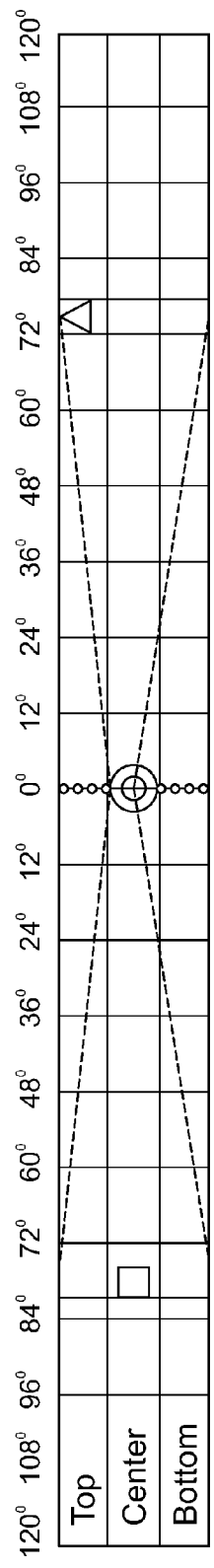

Referring to FIGS. 15-17, illustrative backgrounds for display on screens 302-308 can include or can exclusively be a grid pattern. In typical prior art range training facilities in which target engagement can be measured, because of the danger associated with live rounds fired, there is typically no opportunity to engage targets that are offset horizontally or in elevation from 0 degrees center in front of the trainee 22. Therefore, typical trainees 22 have little training and awareness directed to targets and nontargets appearing through a range of elevations and horizontally offset angles. Furthermore, typical trainees 22 also lack a common frame of reference for communicating about changes and elevation and horizontally offset angles. At least one report indicates that 80% of law enforcement rounds fired in actual incidents fail to hit the intended targets, which is at least in part attributed to not training for targets that are offset for from and center as most prior art training environments are restricted to.

To assist in planning, training, and assessing engagement of targets and recognition of nontargets that are offset in elevation and horizontally from front center of the trainee 24, a common reference of a grid pattern 350, such as that shown in FIG. 16, can be used. The grid pattern 350 can further useful reference in providing stimuli throughout all angles in the horizontal and in elevation, provide symmetry in stimuli between right, left, up, and down, can be used to measure distance from center and between stimulus horizontally and in elevation, and can be used to compare the relative difficulty of different patterns, for example, to assure that a set of different patterns present the same level of difficulty, or that a pattern can be selected that has a desired different level of difficulty.

Additionally, Grid patterns and the associated offset angles horizontally and in elevation that can be used to refer a particular rectangle in the grid helps to ensure that trainees are presented, practice engaging, and understand the relative location of targets throughout the grid pattern 350, for example, as shown in FIG. 17.

For example, the grid pattern 350 can be used to represent an entire area from which fire can be received, for example, entering an area that is enclosed such as room, or open areas such as in the field or streets. Additionally, in training involving or simulating more than one trainee 24, the grid pattern 350 can be referenced to teach separate areas of responsibility (sectors of fire) for lookout and engagement. For example, a particular portion of the grid can be referred to by the left/right offset in degrees from center, or by clock position from center (12 o'clock), and in elevation offset by degrees above or below level, or by up, down, and level.

Additionally, the grid pattern 350 provides a visual reminder that system 100 is a training environment in which it is safe to press hard and stretch beyond the trainee's perceived or actual limitations in skills as in generally necessary to improve firearms skills.

Figure 19:
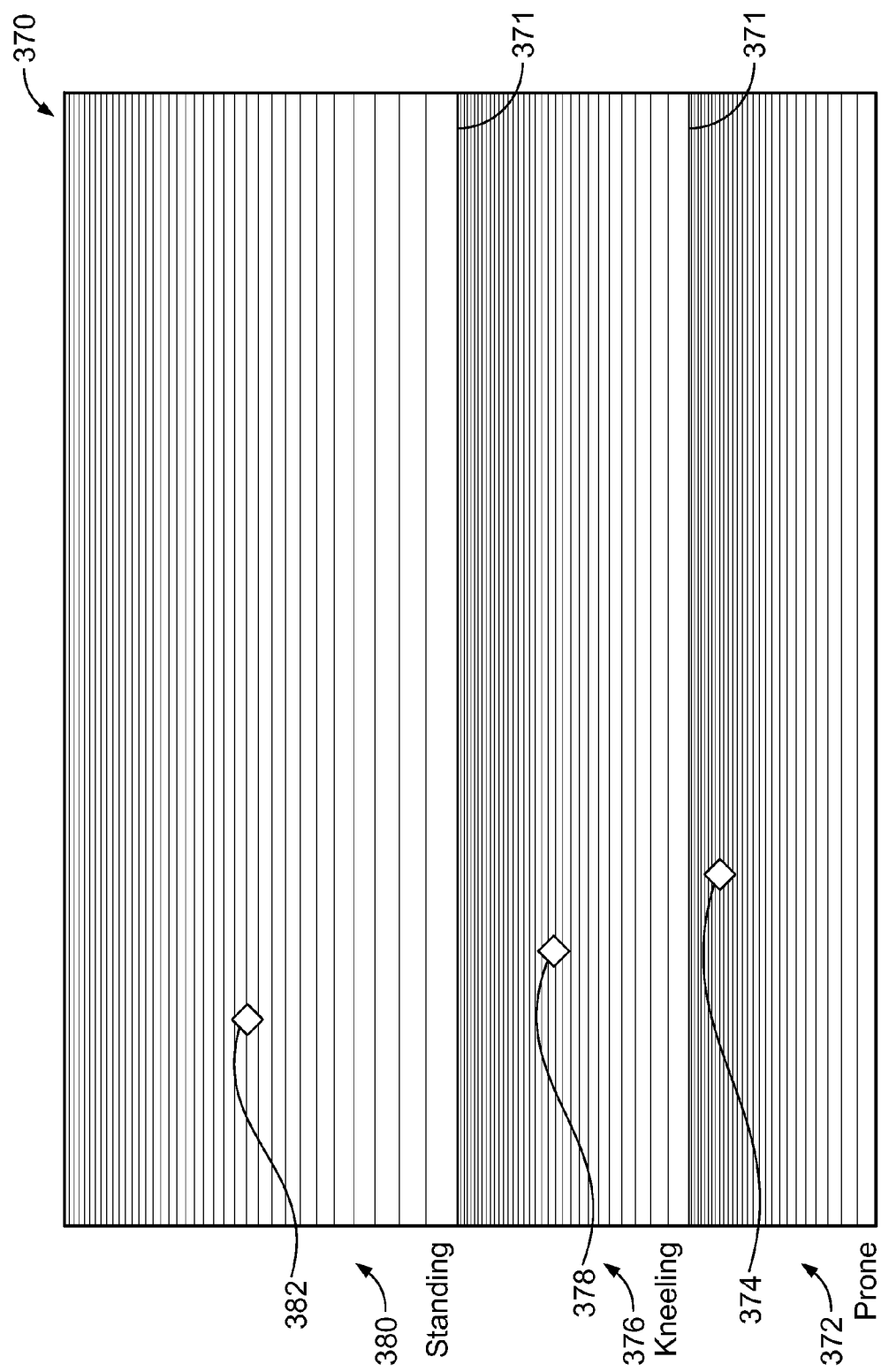
FIG. 19 shows an illustrative background provide on the display system shown in FIG. 7.

Referring to FIG. 19, an illustrative background 370 for display on screens 302-308 is shown. The background 370 is divided in three zones, separated at horizontal locations 371, that span the full width of the screens. The bottom zone 372 is for engaging targets 374 while in a prone firing position, the center zone 376 is for engaging targets 378 while in a kneeling firing position, and the top zone 380 is for engaging targets 382 while in a standing firing position. The use of vertically offset target zones is to prevent improper firearms positions from developing in the system 100 that would likely not be used in the real world. For example, with the trainee 22 positioned a matter of feet from the screens 302-308, the elevation required for firearm 124 to engage targets changes significantly depending on whether a standing, kneeling, or prone firing position is utilized, while in the real world, changing firing position to engage the same target is not likely to cause the same change in elevation unless the target is indeed very proximate to the trainee 22.

To overcome the incorrect conditioning of elevation that could be caused, one of the zones 372, 376, 380 are used for each firing position in order to keep the target XX relatively level with the trainee's eyes, thus minimizing changes in elevation for a target that is intended to be presented level with the trainee 22, and providing a better match of the actual firearms mechanics used in the real world. For example, the system 100 may not take into account real world ballistics that can be affected by firearm elevation and other aspects of engagement, as the laser transmitter 126 is not affected by the firearm mechanics, environment conditionals, and ballistics that exist in a real world target engagement and is simply a point of aim impact device unless such ballistic profiles are computationally taken into account by system 100.

All zones 372, 376, and 380 can be displayed simultaneously and a respective on of targets 374, 378, and 382 provided in the correct zone for the desired trainee 22 firing position, or alternatively, only one zone can be displayed for the desired trainee 22 firing position. Additionally, the appearance of a target in a particular zone can be instruction to the trainee 22 to move to that firing position as part of the engagement of that target. Thus, the display can be used as part of a training drill/scenario that trains the trainee 22 to efficiently move between firing positions as targets are sequentially presenting in the same or a different one of zones 372, 376, and 380. This background 370 and the movement of the trainee 22 between firing positions based on the zone in which a target appears can be used in combination with the below and other training scenarios, including implementing and measuring performance relative to military and law enforcement standards engaging targets with various firing positions. The background 370 may also be used with grid pattern 350.

Illustrative TORA Training Scenarios/Patterns

Various fixed conditioning sequences or scenarios that provide a pattern of targets 322 and require the trainee 22 to perform various skills conditioning tasks are used, including the incorporation of increasing target rigor, for example, increasing speed of target displays (shorter intervals) to an impossible level as the scenario or sets of scenarios used proceed, then reducing the speed to an achievable level, for example, as described above for the methods associated with the K-SET and RSMR training. For example, in TORA, the method 400 can include a set of 20 targets 322 are displayed for a display interval of 1.5 seconds around the full angular range of screens 302-308, whether vertically displaced, or along a set height (or horizontal plane). Next, a set of 20 targets appears at 1.0 second intervals, then 0.75 seconds, then 0.50 seconds, then 0.25 seconds. At the 0.25 seconds target interval, the targets 322 appear to most trainees 22 as too rapid to engage, and appear way to fast to shoot at. By exposing the trainee 22 to these elevated speeds, when the speed is slowed, the trainee 22 is able to accurately engage targets 322 at higher speeds than before being conditioned at the elevated speeds. Various other conditioning drills can be used as part of a training session, for example, before and after elevated speed scenario drills.

Scenario 1, Draw, 20-Front: The drawing of firearm 322 from a holster to a ready position, or from a rest to a ready position for non-holstered firearms 322 is conditioned in the draw scenarios. For example, for draw 20-front, the trainee 22 faces forward, for example, toward screens 304 and 306, a target 322 is displayed on screens 304 and 306, the trainee 22 readies firearm 124, for example drawing it from a holster, sights, and fires upon the target 322. The process repeats to engage a total of 20 targets, for example, displayed on screens 304 and 306.

Scenario 2, Draw, 20-Left: The trainee 22 faces forward, for example, toward screens 304 and 306, a target 322 is displayed on left-hand screen 302, the trainee 22 readies firearm 124, sights, and fires upon the target 322. The process repeats to engage a total of 20 targets, for example, displayed on screen 302.

Scenario 3, Draw, 20-Right: The trainee 22 faces forward, for example, toward screens 304 and 306, a target 322 is displayed on right-hand screen 308, the trainee 22 readies firearm 124, sights, and fires upon the target 322. The process repeats to engage a total of 20 targets, for example, displayed on screen 308.

Scenario 4, Draw, 20-Clap: A target 322 is displayed in a random or preset location on the screens 302-308, the trainee 22 readies firearm 124, for example, drawing it from its holster or otherwise positioning it from a rest to a ready position, sights, fires upon the target 322, returns the firearm 124 to its holster or holster firearm, and claps. This process repeats to engage a total of 20 targets, for example, displayed randomly, for example, on screens 302-308. For example, a predetermined or random but "smooth" distribution pattern that limits the maximum displacement between sequential targets 322 is used.

Scenario 5, Draw, 20-Step: A target 322 is displayed in a random or present location on the screens 302-308, the trainee 22 readies firearm 124, sights, fires upon the target 322, returns the firearm 124 to its rest position, and steps around or over an obstacle 328. This process repeats to engage a total of 20 targets 322 displayed randomly, for example, on screens 302-308.

Scenario 6, 180 Degree Drill: Scenario 6 and the next three scenarios are designed to enhance the trainee's economy of motion, e.g., straight line movement of firearm 124 from one target 322 to the next. A target 322 is displayed on the left screen 302, the trainee fires upon the target 322, and then a subsequent target 322 is displayed about 180 degrees relative to the trainee 22 from the first target 322, for example, on the right screen 308. This process repeats to engage a total of 20 targets, for example with the first of each target set alternating between being displayed on the left screen 302 or the right screen 308.

Scenario 7, 90 Degree Drill: Target 322 are displayed and engaged at about 90 degree increments relative to the trainee 22. For example, a target 322 is displayed on the left screen 302, the trainee fires upon the target 322, a subsequent target 322 is displayed 90 degrees from the first, for example, on the front screens 304-306. After the trainee fires upon the target 322 located on the front screens 304-306, a subsequent target 322 is displayed 90 degrees from that target, for example, on the right screen 308. This process repeats to engage a total of 12 targets, for example, with the first of each target set alternating between being displayed on the left screen 302 or the right screen 308.

Scenario 8, 45 Degree Drill: Targets 322 are displayed and engaged at about 45 degree increments relative to the trainee 22. For example, a target 322 id displayed on the left screen 302, the trainee fires upon the target 322, and a subsequent target 322 is displayed on the front screen 304. After the trainee fires upon the target 322 on screen 304, a subsequent target 322 is displayed on the front screen 306. After the target 322 on screen 306 is engaged, a target 322 is displayed and engaged on screen 308. This process repeats to engage a total of 16 targets, for example, with the first of each target set alternating between being displayed on the left screen 302 or the right screen 308.

Scenario 9, 36 Degree Drill: Targets 322 are displayed and engaged at about 36 degree increments relative to the trainee 22. For example, a target 322 is displayed on the left screen 302, the trainee fires upon the target 322, and a subsequent target 322 is displayed about 36 degrees relative to the trainee 22 and the first target, for example, on the left side of the front screen 304. After the trainee fires upon the target 322 on screen 304, a subsequent target 322 is displayed an addition about 36 degrees, for example, at about the intersection of the front screens 304 and 306. After that target is engaged, a target 322 is displayed at an increment of about another 36 degrees, for example, on the right side of the front screen 306. After that target 322 is engaged, a subsequent target 322 is displayed at an increment of about another 36 degrees, for example, on the right screen 308. This process repeats to engage a total of 15 targets, for example, with the first of each target set alternating between being displayed on the left screen 302 and the right screen 308.

Figure 10:
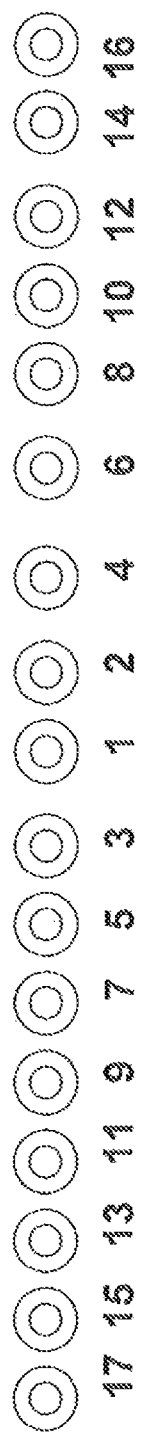
FIG. 10 shows an illustrative target pattern associated with an indexed linear training scenario of the disclosed methods and systems.

Scenario 10, Indexed Linear: The indexed drills condition the trainee 22 to keep the properly indexed in the transition between targets 322, to check the barrel locked in position with the eyes, to use economy of motion, and consistent sight alignment. For example, as shown in FIG. 10, a first target 322 is displayed and engaged at the center of front screens 304 and 306. Each subsequent target 322 is displayed and engaged and incrementally increasing angles left and right of the location of the first target 322 until targets 322 are displayed and engaged both about 90 degrees left and about 90 degrees right of the first target. This process repeats until 57 targets, for example, are displayed and engaged.

Figure 11:
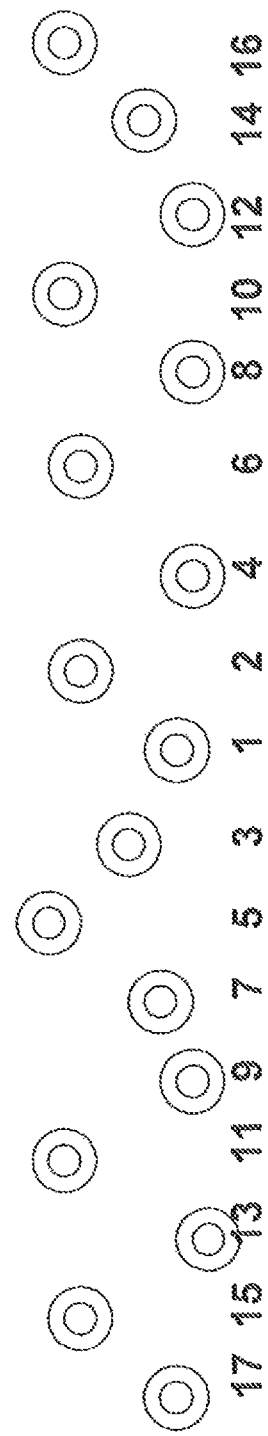
FIG. 11 shows an illustrative target pattern associated with an indexed up and down training scenario of the disclosed methods and systems.

Scenario 11, Indexed Up and Down is another linear target drill for training proper level indexed transition between targets 322. For example, as shown in FIG. 11, a first target 322 is displayed and engaged at the center of front screens 304 and 306. Each subsequent target 322 is displayed and engaged and incrementally increasing angles left and right of the location of the first target 322 and displaced vertically alternatingly up and down until targets 322 are displayed and engaged both about 90 degrees left and about 90 degrees right of the first target. This process repeats until 57 targets, for example, are displayed and engaged.

Scenarios 12 and 13, Reverse Reflex Drills: designed to strengthen the backward reflex abilities of the trainee 22. Referring to FIG. 12, trainees engage targets 322 that index a fixed amount, for example 18 feet left (or right), and then the subsequent target 322 is displayed and engaged half that fixed amount in the opposite direction, for example 9 feet right (or left). The scenario strengthens the trainee's ability to react to a threat previously passed by. This process repeats for 37 targets, for example.

Scenario 14, Random 20, Open Mode: Referring to FIG. 13, the trainee 22 engages targets 22 displayed in the open mode, i.e a target 322 remains until successfully engaged, then a subsequent target 322 is displayed. For example, the target pattern shown in FIG. 13 can be used until a total of 20 targets, for example, are engaged.

Scenario 15, Random 20, Fixed Mode: Referring to FIG. 14, the trainee 22 engages targets 22 displayed in the fixed mode, i.e. a target 322 remains for a fixed interval, for example about 1.5 seconds, whether successfully engaged or not, then a subsequent target 322 is displayed. For example, the target pattern shown in FIG. 13 can be used until a total of 20 targets, for example, are sequentially displayed Scenario 16, Pattern #1, Fixed Mode at 1.0 second intervals: Twenty targets 322 are sequentially displayed throughout the screens 302-308, for example, using pattern #1 shown in FIG. 15; however, other repeating patterns can be substituted. The targets 322 appear one at a time for the fixed time interval or until successfully engaged. The locations of the targets 322 have been intentionally selected in order to cover the full range of motion up, down, up-left, down-right, straight ahead, and so on. The trainees 22 run through variations of this sequence in the next 10 scenarios. In doing so, the trainee 22 will notice a development of muscle memory and an intuitive ability to turn, sight, and fire. The repetition of this sequence is essential for the trainee 22 developing self confidence and fine tuning target engagement skills.

Scenario 17, Pattern #1, No Shot, Fixed Mode at 0.75 seconds: The trainee 22 only sights and tracks the targets 322, there is no engagement with the firearm 124. The no shot scenarios condition the trainee's ability to quickly sight the targets 322 around the area 326. By eliminating the need to aim and fire the firearm 124, the trainee 22 will gain confidence in his or her ability to track objects at short time intervals, for example 0.50 second.

Scenario 18, Pattern #1, No Shot, Fixed Mode at 0.50 seconds: The trainee 22 only sights and tracks the targets 322, there is no engagement with the firearm 124.

Scenario 19, Pattern #1, No Shot, Fixed Mode at 0.25 seconds: The trainee 22 only sights and tracks the targets 322, there is no engagement with the firearm 124.

Scenario 20, Pattern #1, Fixed Mode, at 1.5 second intervals: Twenty targets 322 are sequentially displayed throughout the screens 302-308. The targets 322 appear one at a time for earlier of the fixed time interval or until successfully engaged. After trying to visually sight and track targets at 0.25 seconds intervals, the trainee 24 should be able to comfortably and successfully engage targets displayed at an interval of 1.5 seconds.

Scenario 21, Pattern #1, Fixed Mode at 1.0 second intervals: Twenty targets 322 are sequentially displayed throughout the screens 302-308. The targets 322 appear one at a time for earlier of the fixed time interval or until successfully engaged.

Scenario 22, Pattern #1, Fixed Mode at 0.75 second intervals: Twenty targets 322 are sequentially displayed throughout the screens 302-308. The targets 322 appear one at a time for earlier of the fixed time interval or until successfully engaged.

Scenario 23, Pattern #1, Fixed Mode at 0.50 second intervals: Twenty targets 322 are sequentially displayed throughout the screens 302-308. The targets 322 appear one at a time for earlier of the fixed time interval or until successfully engaged.

Scenario 24, Pattern #1, Fixed Mode at 1.5 second intervals: Twenty targets 322 are sequentially displayed throughout the screens 302-308. The targets 322 appear one at a time for earlier of the fixed time interval or until successfully engaged.

Scenario 25, 3-5-7 Pattern: Each of multiple sets will sequentially display a target 322 at center, for example on the screens 304 and 306, then to one side, for example on the screen 308. Each target 322 to a side in a set may be progressively further displaced from the target 322 at the center displayed between each shot to the side. The scenario can follow a pattern of how many targets 322 are displayed on each side before progressing to the next set, which for example can be the same number of targets 322 on the opposite side. For example, the pattern, which includes each side target 322 preceded with a target 322 at the center, can bee three targets 322 to the right, for example on screen 308, three targets to the left, for example on screen 302, five targets to the right, five targets to the left, seven targets to the right, and seven targets to the left. The targets 322 can be vertically located along the same horizontal line.

Scenario 26, 3-5-7 Pattern Up and Down: can use the same pattern as scenario 25 except that each side and/or center target 322 can vary in its vertical placement in a set or random fashion.

Figure 20:
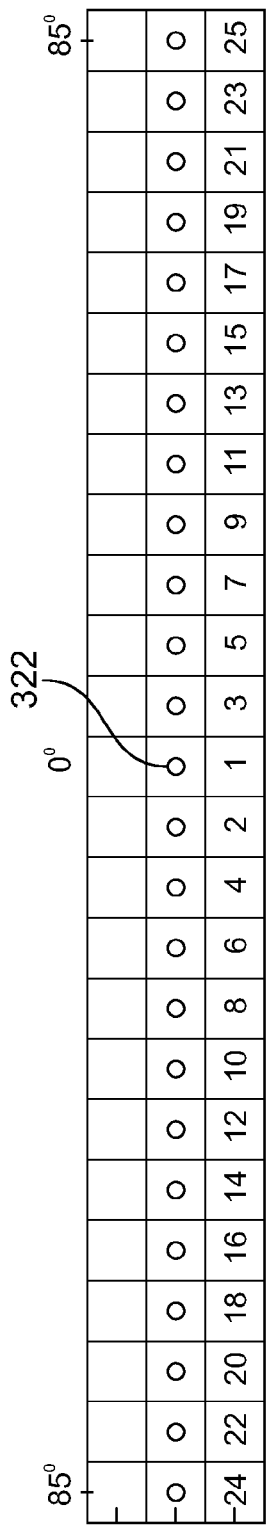
FIGS. 20, 21, and 22 show illustrative target scenarios presented on the illustrative grid pattern of FIG. 16.

Scenario 27, Modified Indexed Linear: The indexed drills condition the trainee 22 to keep the properly indexed in the transition between targets 322, to keep the eyes free from the firearm until sighting the target, to use economy of motion, to check the barrel locked in position with the eyes, and consistent sight alignment. For example, as shown in FIG. 20, a first target 322 is displayed and engaged at 0 degrees, i.e., at the center of front screens 304 and 306. Each subsequent target 322 is displayed and engaged in incrementally increasing angles alternating left and right of the location of the first target 322 (or alternating right and left), and continuing until targets 322 are displayed and engaged both about 85 degrees left and about 85 degrees right of the first target. This process repeats until about 25 targets, for example, are displayed and engaged. For example, if a firearm with iron sights is used by the trainee, a fixed interval period of 1 second for targets can be used, and if a firearm with any type of optical sights is used by the trainee, a fixed interval period of 0.75 seconds for targets can be used.

Figure 21:
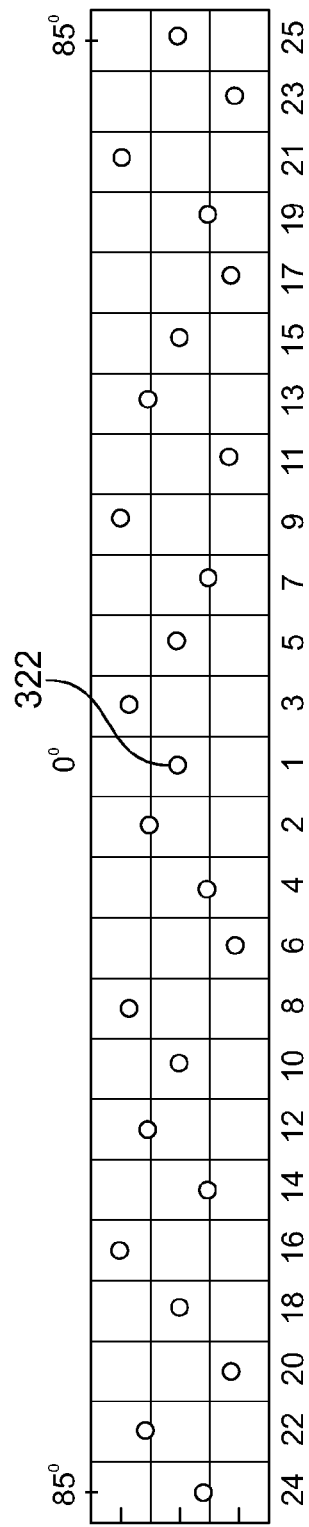

Scenario 28, Modified Indexed Up and Down is another linear target drill for training proper level indexed transition between targets 322. The scenario is similar to Scenario 27 but further adds changes in elevation of the targets. For example, as shown in FIG. 21, a first target 322 is displayed and engaged at 0 degrees, the center of front screens 304 and 306, and elevation level (center). Each subsequent target 322 is displayed and engaged and incrementally increasing angles alternating left and right of the location of the first target 322 (or alternating right and left) and displaced vertically randomly or alternatingly up, down, and center until targets 322 are displayed and engaged both about 85 degrees left and about 85 degrees right of the first target. This process repeats until about 25 targets, for example, are displayed and engaged.

Scenario 29, Modified Random 20, 85 Degrees, Open Mode: Referring to FIG. 13, the trainee 22 engages targets 322 displayed in the open mode, i.e a target 322 remains until successfully engaged, then a subsequent target 322 is displayed. For example, the targets 322 appear in random locations (or appearing random, for example, unpredictable to avoid location pattern recognition) within about 85 degrees left and about 85 degrees right of center (0 degrees), and elevation within about the upper and lower limits of the screens 304 and 306. For example, the target pattern shown in FIG. 13 can be used until a total of 20 targets, for example, are successfully engaged. The scenario drill teaches freeing the eyes from the firearm sights after target engagement and returned to center so that the next target can be sighted within the wide about 170 degrees field of view, thus avoiding tunnel vision from fixation on the last target area.

Scenario 30, Modified Random 20, 85 Degrees, Fixed Mode: Referring to FIG. 14, the trainee 22 engages targets 322 displayed in the fixed mode, i.e. a target 322 remains for a fixed interval, for example about 1.0 seconds, whether successfully engaged or not, then a subsequent target 322 is displayed. For example, the scenario can be the same as for Scenario 29 as described above and shown in FIG. 13, except that the targets are presented in fixed mode. Generally, Scenario 29 is completed by a trainee 22 until a desired level of success and comfort with the drill is achieved and then Scenario 30 is completed.

Figure 22:
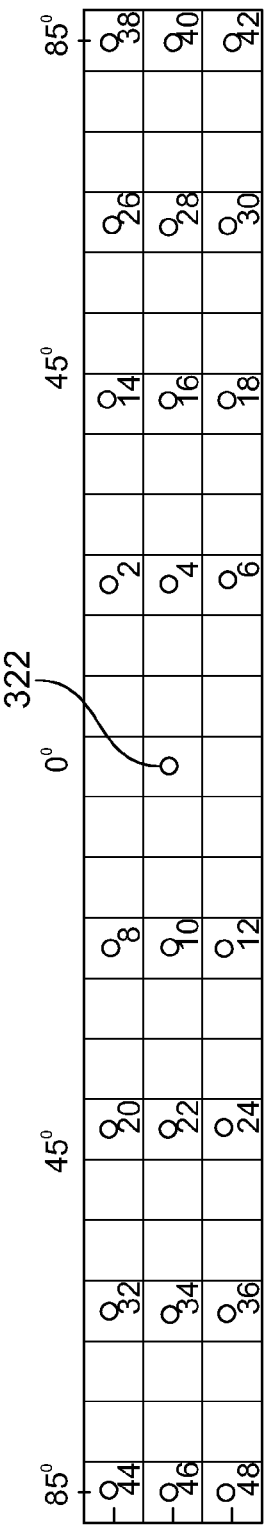

Scenario 31, Modified 3-5-7 Pattern: Referring to FIG. 22, a first target 322 is displayed at 0 degrees, e.g., center of the screens 304 and 306, and level (center) elevation, followed by a target 2 that is offset to one side and elevation, for example 18 degrees to the right and high, followed again by a target 3 that is at 0 degrees and level elevation, and then target 4 again to the same offset to one side and a different elevation, for example, level, followed again by a target 5 that is at 0 degrees and level elevation, followed by a target 6 that is again the same offset to one side and yet another elevation, for example, low, followed yet again by a target 7 that is at 0 degrees and level elevation. The next set of targets can repeat this sequence of center and offset targets, but offset in an opposite direction, for example, targets labeled 8-13 in FIG. 22. Each subsequent target set offset to a side in a set may be progressively further displaced from the target 1 at the center displayed between each shot to the side. The scenario can follow a pattern of how many targets 322 are displayed on each side before progressing to the next set, which, for example, can be the same number of targets on the opposite side and subsequent further offsets sets, or an increased number of targets can be used. For example, the pattern, which includes each side target 322 preceded with a target 322 at the center, can be three targets 322 to the right, for example on screen 308, three targets to the left, for example on screen 302, five targets to the right, five targets to the left, seven targets to the right, and seven targets to the left.

Figure 23:
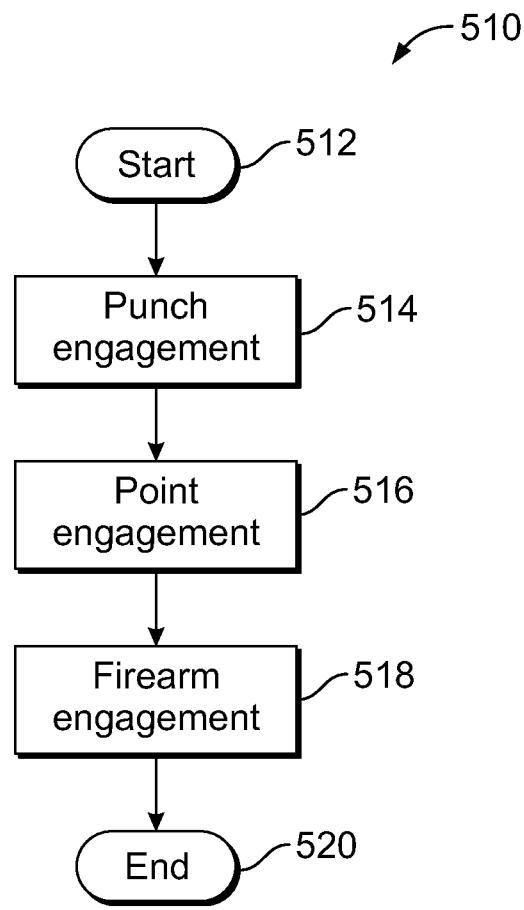
FIG. 23 shows an illustrative method of training that can be used with the systems and scenarios disclosed herein.

Punch, Point, Shoot Drill: Mental and ocular acceptance that targets with increasing rigor can be successfully engaged is important to enhancing firearms skills. The follow drill can be helpful in overcoming a mental block to the mental and ocular acceptance required for enhancing skills, and can be used with any of the above scenarios. Referring to FIG. 23, in step 512 the drill begins. In step 514 the trainee is instructed to engage each target without a firearm by using their lead hand (non-trigger hand) and with a fist, punch toward each target that is presented while saying "BAM". Step 514 combines the ocular skill of sighting the target 322 with a gross motor skill of punching toward the target and a fine motor skill of saying "BAM" or another vocalization of engaging the target. After all of the targets of the selected scenario are engaged in this way, step 514 is completed with the trainee being asked if the targets were successfully engaged in this way, the result expected to be an acceptance that engagement in this step was easy.

In step 516 the trainee is instructed to engage each target without a firearm by using their lead hand with a pointing finger to point toward each target of the same selected scenario, sighting (focusing) the end of the pointing finger as if it was the front sight of a firearm, and again saying "BAM" or a similar vocalization of engaging the target. After all of the targets of the selected scenario are engaged in this way, step 516 is completed with the trainee being asked if the targets were successfully engaged in this way, the result expected to be an acceptance that engagement in this step was easy, and the trainee is then asked if they now can engage the targets with their firearm, to which the mental acceptance response of "yes" is reached. Then in step 518 the trainee is instructed to again engage each target in the scenario using a firearm, and in practice, a much higher level of success in engaging the targets of the selected scenario is achieved than before the drill.

Weaponized Workout

Referring to FIGS. 24A-24F, another illustrative training drill that can be done with or without the system 100 is a workout with a firearm 124. Although the illustrations show the firearm 124 being used as a weight training tool while performing various exercises; however, alternatively, the firearm 124 can be placed in a safe position during the various exercises and a training weight such as a kettlebell used, or no weight used. Advantageously, between the various exercises, or sets of a particular exercise, one or more targets, for example, one of the above listed scenarios, can be provided by system 100, thus the trainee 24 can complete or otherwise stop the exercise in order to prepare and use the firearm 124 to engage the targets and/or other stimuli presented in the scenario. For example, instructions for the exercises can be provided on the displays 302-308, or audibly by the system 100, and various exercises interleaved with target scenarios.

Figure 24C:
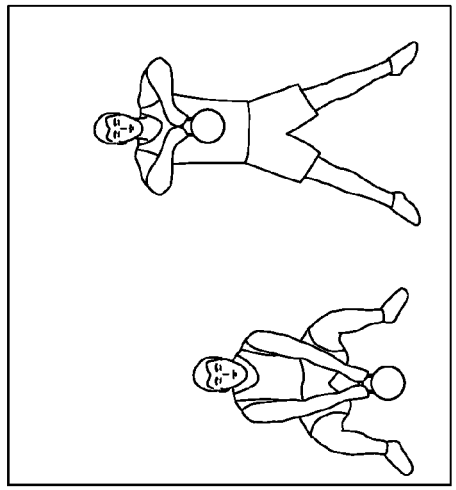
FIGS. 24A-24F show an illustrative method of weaponized exercise training that can be used with the systems and scenarios disclosed herein.
Figure 24B:
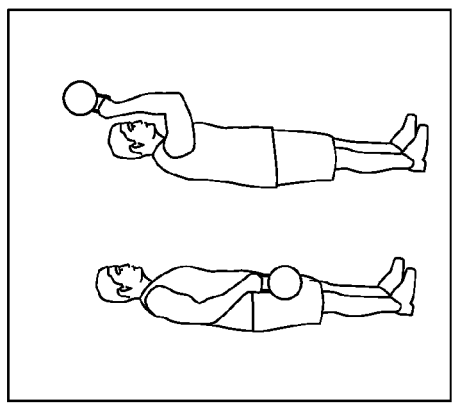
Figure 24A:
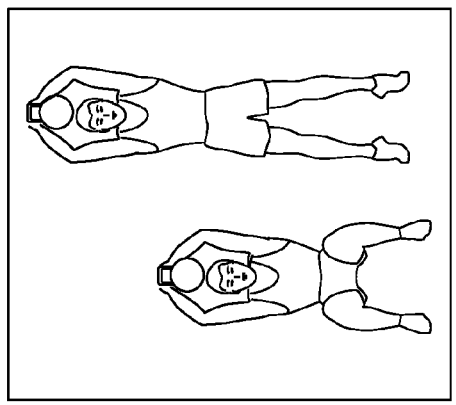
Figure 24F:
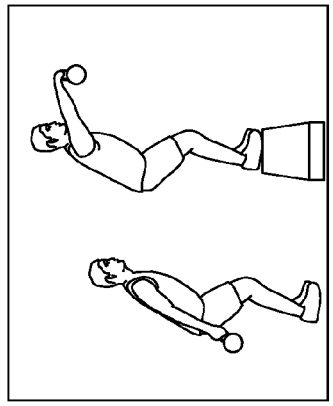
Figure 24E:
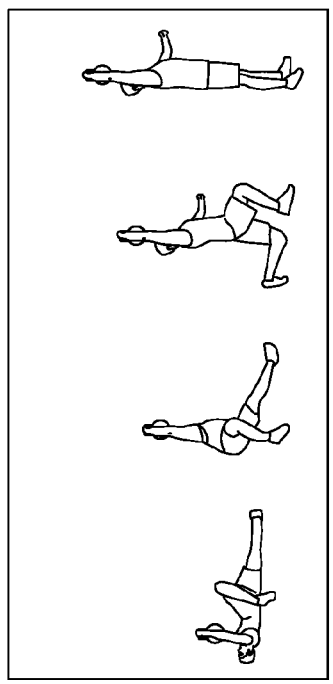
Figure 24D:
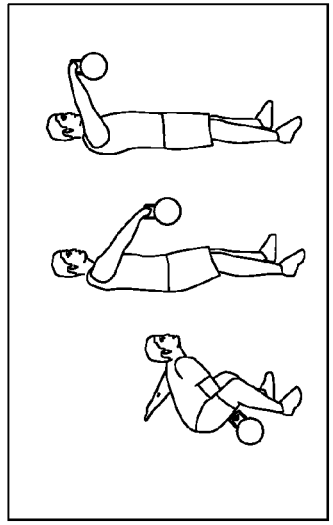

For example, one such weaponized workout is shown in the exercises shown in FIGS. 24A-24F, with a target scenario presented between each exercise. For example, FIG. 24A illustrates air squats, FIG. 24B illustrates kettlebell bottoms up, FIG. 24C illustrates summon pulls, FIG. 24D illustrates kettlebell swings, FIG. 24E illustrates kettlebell Turkish get ups, and FIG. 24F illustrates box jumps. A subset of or alternative combination of the above and additional exercises known in the art can be used alone or in combination with target scenarios presented by system 100, or an alternative system using the training methods disclosed here.

Figure 25A:
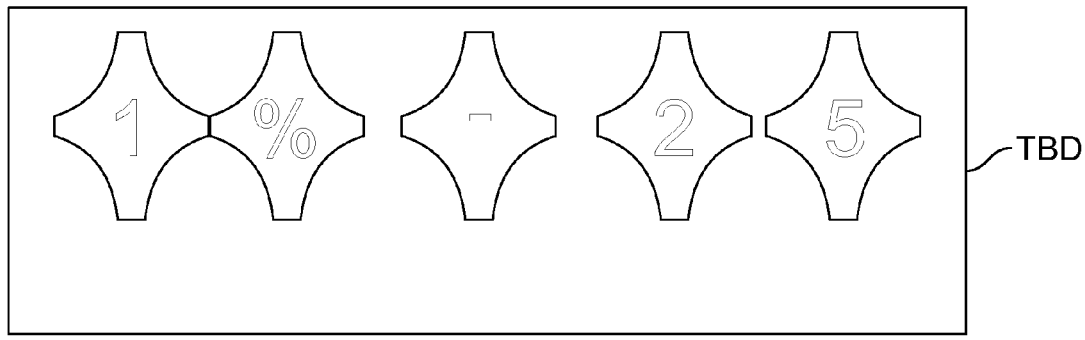
FIGS. 25A-25C show illustrative stimuli sets that can be used with the systems and scenarios disclosed herein.
Figure 25B:
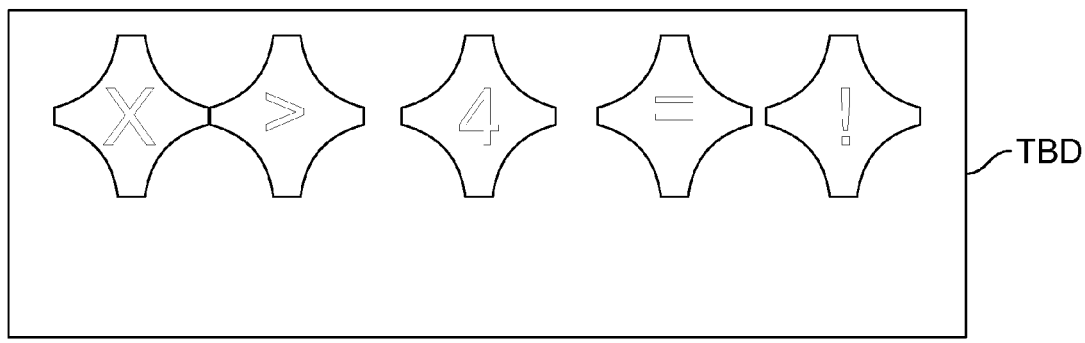
Figure 25C:
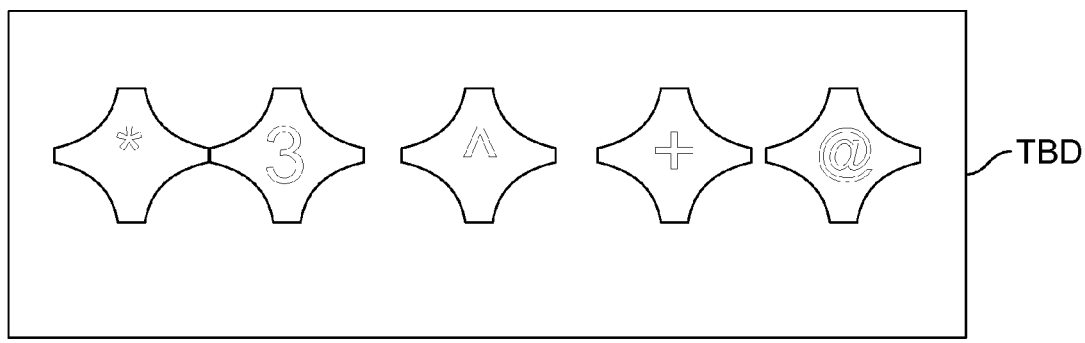

Referring to FIGS. 25A-25C, an illustrative target display that can be used with the weaponized workout, or with any other above scenario illustrates that stimuli complexity may include symbology that must be recognized in order to engage one or more targets within a group of simultaneously or sequentially presented stimuli. For example, in FIG. 25A, the trainee 24 may be instructed to shoot the stimuli with the numeral "1", and in FIGS. 25B and 25C, the trainee 24 may be instructed to shoot the stimuli that is marked with any numeral, The above listed scenarios are illustrative only and variations or alternative conditioning patterns can be utilized with the systems and methods 20, 100, 200, 300, and 400.

While the invention has been illustrated and described in detail in the foregoing drawings and description, the same is to be considered as illustrative and not restrictive in character, it being understood that only illustrative embodiments thereof have been shown and described and that all changes and modifications that come within the spirit and scope of the invention as defined in the following claims are desired to be protected. For example, various methods, scenarios, steps and other functions identified as performed by an individual could be performed by hardware, or vice-versa, and such hard including, for example, a specially programmed data processor associated with the disclosed system.

The invention claimed is:

1. A method of conditioning a trainee's firearms skills, comprising the steps of:
    collecting a trainee profile of pre-engagement attributes, including trainee's physical attributes, firearm attributes, and trainee's firearm use attributes;
    sequentially displaying visual stimuli, including targets to be engaged by the trainee with a firearm;
    capturing engagement data relating to the trainee's engagement of the targets;
    a trainer analyzing the engagement data to identify performance deficiencies; and
    the trainer further analyzing the engagement data and performance deficiencies relative to the trainee's pre-engagement profile to identify at least one assumed remediation likely to improve the performance deficiencies.

2. The method of claim 1, further comprising the step of the trainee performing the at least one assumed remediation.

3. The method of claim 2, wherein the steps of sequentially displaying, capturing, and a trainer analyzing the engagement data are repeated in order to determine if the at least one assumed remediation was effective in enhancing the trainee's firearms skills, and if not, the trainer further analyzing the engagement data and performance deficiencies relative to the trainee's pre-engagement profile to identify at least on additional assumed remediation likely to improve the performance deficiencies.

4. The method of claim 1, wherein the at least one assumed remediation includes a change in firearms handling.

5. The method of claim 1 wherein the at least one assumed remediation includes performing a particular set of firearms training drills.

6. The method of claim 1, wherein the engagement data includes the shot location relative to each displayed target.

7. The method of claim 1, wherein the engagement data includes firearm barrel path relative to a straight path to each displayed target.

8. The method of claim 7, wherein the barrel path and shot location are determined by tracking an emitter associated with the firearm, the emitter projecting onto a surface on which the visual stimuli are displayed.

9. The method of claim 1, wherein the step of the trainer further analyzing, includes the trainer analyzing at least in part based on pre-engagement profile attributes, performance, and deficiency trends collected in conditioning other trainees.

10. A method of conditioning a trainee's firearms skills, comprising the steps of:
    collecting a trainee profile of pre-engagement attributes, including trainee's physical attributes, firearm attributes, and trainee's firearm use attributes;
    sequentially displaying visual stimuli, including targets to be engaged by the trainee with a firearm;
    capturing engagement data relating to the trainee's firearm mechanics and shot performance against each target;
    a trainer analyzing the engagement data to identify performance deficiencies;
    the trainer further analyzing the engagement data and performance deficiencies relative to the trainee's pre-engagement profile to identify at least one assumed remediation likely to improve the performance deficiencies; and
    the trainee performing the at least one assumed remediation.

11. The method of claim 10, wherein the steps of sequentially displaying, capturing, and a trainer analyzing the engagement data are repeated in order to determine if the at least one assumed remediation was effective in enhancing the trainee's firearms skills, and if not, the trainer further analyzing the engagement data and performance deficiencies relative to the trainee's pre-engagement profile to identify at least on additional assumed remediation likely to improve the performance deficiencies.

12. The method of claim 10, wherein the at least one assumed remediation includes a change in firearms mechanics.

13. The method of claim 10, wherein the at least one assumed remediation includes performing a particular set of firearms training drills.

14. The method of claim 10, wherein the engagement data includes firearm barrel path relative to a straight path to each displayed target.

15. The method of claim 14, wherein the barrel path and shot performance are determined by tracking a laser mounted on the firearm, the laser projecting onto a surface on which the visual stimuli are displayed.

16. The method of claim 10, wherein the step of the trainer further analyzing, includes the trainer analyzing at least in part based on pre-engagement profile attributes, performance, and deficiency trends collected in conditioning other trainees.

17. The method of claim 10, wherein the trainee's profile of attributes includes the trainee's past training and performance history.

\* \* \* \* \*